(12) United States Patent
Wahl

(10) Patent No.: US 7,266,087 B2
(45) Date of Patent: Sep. 4, 2007

(54) IP PLATFORM FOR ADVANCED MULTIPOINT ACCESS SYSTEMS

(75) Inventor: Stefan Wahl, Schwieber-dingen (DE)

(73) Assignee: Alcatel, Paris (FR)

( * ) Notice: Subject to any disclaimer, the term of this patent is extended or adjusted under 35 U.S.C. 154(b) by 1001 days.

(21) Appl. No.: 10/285,508

(22) Filed: Nov. 1, 2002

(65) Prior Publication Data
US 2003/0103525 A1    Jun. 5, 2003

(30) Foreign Application Priority Data
Nov. 30, 2001   (EP)   ................... 01440405

(51) Int. Cl.
*H04J 1/16* (2006.01)
(52) U.S. Cl. .................. 370/252; 370/204; 370/329
(58) Field of Classification Search ................ 370/215, 370/328, 329, 412–418, 204, 277, 378, 252; 375/260; 455/434
See application file for complete search history.

(56) References Cited
U.S. PATENT DOCUMENTS
6,801,770 B2 * 10/2004 Rinne et al. ................. 455/434

6,836,515 B1 * 12/2004 Kay et al. .................... 375/260

FOREIGN PATENT DOCUMENTS
DE         19927582 A1     12/2000
WO         WO 0013436      3/2000

* cited by examiner

*Primary Examiner*—John Pezzlo
(74) *Attorney, Agent, or Firm*—Sughrue Mion, PLLC

(57) ABSTRACT

In LMDS systems the downlink bandwidth is continuously varying in time because each downlink burst uses a network termination individual modulation and coding (Physical layer) scheme, the higher layer (IP) functions cannot perform service priority respecting traffic shaping. The invention proposes mainly to combine both framing and IP layer functions within one inter-layer framer. The combination of both information ensures QoS provisioning in case of multi-modulation and multi-coding environment. The QoS queue server gets always informed on the actual amount of available data frame bits from the downlink framer and therefore, the QoS queue server is able to decide on the next IP packet or packet fraction to transport. This decision is always based on service priority aspects. As soon as the downlink frame is filled—supposing that the maximum downlink frame rate is always lower than the internal processing in the inter-layer framer—the QoS server stops the data delivery.

4 Claims, 15 Drawing Sheets

IP PLATFORM FOR ADVANCED
MULTIPOINT ACCESS SYSTEMS

TECHNICAL FIELD

The invention concerns an IP platform for advanced multipoint access systems, in particular part LMDS System. The invention is based on a priority application EP 01 440 405.7, which is hereby incorporated by reference.

BACKGROUND OF THE INVENTION

In LMDS systems the downlink bandwidth or data rate is continuously varying in time because each downlink burst uses a network termination individual modulation and coding (Physical layer) scheme. Due to the non constant downlink data rate the higher layer (IP) functions cannot perform service priority respecting traffic shaping. The queuing function block within the base station has to buffer the offered IP traffic and has to take into account the various service priorities and the framer functional block has to generate the downlink frame. The problem is that neither the framer knows anything on the QoS (quality of service) requirements of the offered load nor the QoS queuing knows something about the actual available downlink bandwidth or data rate. This leads to a loss of QoS in the downlink radio path.

SUMMARY OF THE INVENTION

The invention claims a base station for a point-to-multipoint radio network, in particular LMDS, including an inter-layer framer, the inter-layer framer including a series connection of a queuing module and a downlink framer, the downlink framer having a feedback loop to the queuing module to stepwise transmit the actual number of unused symbols in the next frame to be transmitted via the downlink, and the queuing module being capable to stepwise decide which information packet to be forwarded to the downlink framer in order to include the information packet into the next frame, the decision being dependent on the actual number of unused symbols received by the downlink framer.

In an advantageous embodiment of the invention the queuing module includes at least two queues to intermediately store different prioritized quality of services parameters, and the queuing module is being capable to decide which information packet to be forwarded to the downlink framer in order to include the information packet into the next frame, the decision being dependent on the actual number of unused symbols received by the downlink framer, the priority of the quality of services parameters, and the length of the corresponding intermediately stored information packets to be forwarded.

In a further advantageous embodiment of the invention the queuing module includes a processor and at least two queues to intermediately store different quality of services parameters. The queues include e.g. storage means like memory or RAM. The processor is e.g. a digital signal processor, a controller, a microprocessor, a server or the like. The processor is e.g. programmed by a specific software, e.g. a computer program written in programming language C or C++, in order to perform the decision process. The decision process capability could also be implemented via a hardware solution using e.g. decision logic.

In a further advantageous embodiment of the invention the information packets are QPSK and/or QAM modulated data packets and/or QPSK and/or QAM modulated IP packets. The QAM modulation could be e.g. 16 QAM and/or 64 QAM or the like. The information packets could in addition be encoded, e.g. using FEC or CRC, FEC=forward error correction.

In a LMDS system information packets are transmitted from a base station to at least one subscriber station via radio. The base station is e.g. connected to an IP network to transmit and receive IP packets. At least three layers are used for the packet transmission. The phy layer includes the modulation and encoding information for the packets. The MAC layer includes MAC information like grant messages. The IP layer includes quality of service information inserting priority for different kind of packet categories/classes, e.g. best effort, guaranteed data rate, or the like. The base station includes an IP classifier to select the different QoS classes. The corresponding packets are intermediately stored. The decision which of the intermediately stored packets is forwarded first to the downlink framer is taken in a queuing module. Normally the packets with a higher priority are served first. To fill up a new frame to be transmitted via radio the frame indicated to the queuing mode the actual number of unused symbols. At the beginning the frame is empty, so the maximum number is transmitted to the queuing module. The queuing module selects the packet with the highest priority and which is intermediately stored longest and transmits it to the downlink framer. The downlink framer determined the actual number of symbols unused in the next frame to be transmitted (corresponding to the maximum number minus the symbols of the received packet) and transmits this number to the queuing module. The queuing module selects the packet with the highest priority and which is intermediately stored longest and transmits it to the downlink framer. The downlink framer determined the actual number of symbols unused in the next frame to be transmitted (corresponding to the maximum number minus the symbols of the received two packet) and transmits this number to the queuing module. This procedure will continue till the next frame is full. The next frame will be transmitted via radio to the subscriber stations and the same procedure starts for the next frame to be transmitted. If the packet with highest priority does not fit into the rest of the unused frame the queuing module can select a packet with a shorter length, e.g. having a different modulation. This could also be a packet with a low priority. The decision process how to forward intermediately stored packets could also be a specific algorithm, e.g. first transmit e.g. ten packets with highest priority, then three packets with lower priority and then one packet with lowest priority to guarantee forwarding of all QoS classes. The rest of a frame could be filled up with packets who fit into the gap.

The invention proposes inter alia to combine both framing and IP layer functions within one inter-layer framer. The combination of both informations ensures QoS provisioning in case of multi-modulation and multi-coding environment.

The QoS queue server gets always informed on the actual amount of available data frame bits from the framer and therefore, the QoS queue server is able to decide on the next IP packet or packet fraction to transport. This decision is always based on service priority aspects. As soon as the downlink frame is filled—supposing that the maximum downlink frame rate is always lower than the internal processing in the inter-layer framer—the QoS server stops the data delivery. At latest moment—means that there is sufficient time to fill the next downlink frame—the QoS server starts again to decide on and to deliver of the IP packets (fragments) for the next downlink frame. The (IP)

packet classification ascertains with the help of the database all the QoS, MAC and Phy parameters which are required for the framer processing. These values and the storage position of the data packet are inserted into a packet representative which is forwarded to the dedicated logical queue. Simultaneously to the forwarding, the data packet is stored in the central CSL packet memory. The weighted queueing and data packet read processor module selects a data packet from one of his queues and then starts to provide the framing sub-module with data packet portions which fit exactly into the dedicated TCL packet payload. All the required information for this processing is stated in the packet representative.

QoS provisioning, e.g. service or flow priority serving, is possible in a variable link speed environment, e.g. multi-modulation and/or coding (data recipient dependent modulation coding).

The invention allows prioritized packet forwarding and requires minimum amount of memory space, because of the application of a shared memory concept. A less complex downlink framer could be used.

BEST MODE FOR CARRYING OUT THE INVENTION

The following describes the functions required within an IP based Local Multipoint Distribution Service (LMDS) System (including Base Station and Subscriber Stations) to provide QoS in this fixed broadband wireless access network. It has been supposed that the Differentiated Service Architecture will be applied. The specified functions are structured according to the layering in the network layering model and also according to their location. The described functions encompass also multi-provider and multi-subscriber environment with different Service Level Agreements. The following further describes the required functions of an (IP) packet based LMDS system. The focus within this document is on the MAC and (IP) network layer functions which assure Quality of Service (QoS) for legacy and QoS aware applications. Hereby, the Differentiated Service Architecture is applied to add QoS features. The alternative Integrated Service Architecture was not taken into account due to the major scalability problem, but the invention could nevertheless be also applied to this alternative.

Different alternative solutions are described on various layers.

The purpose of the Local Multipoint Distribution Service (LMDS) System is to provide wireless bidirectional broadband connections between a number of stationary customers and a backbone network. The backbone network can be a public or a private network.

Figure 1:
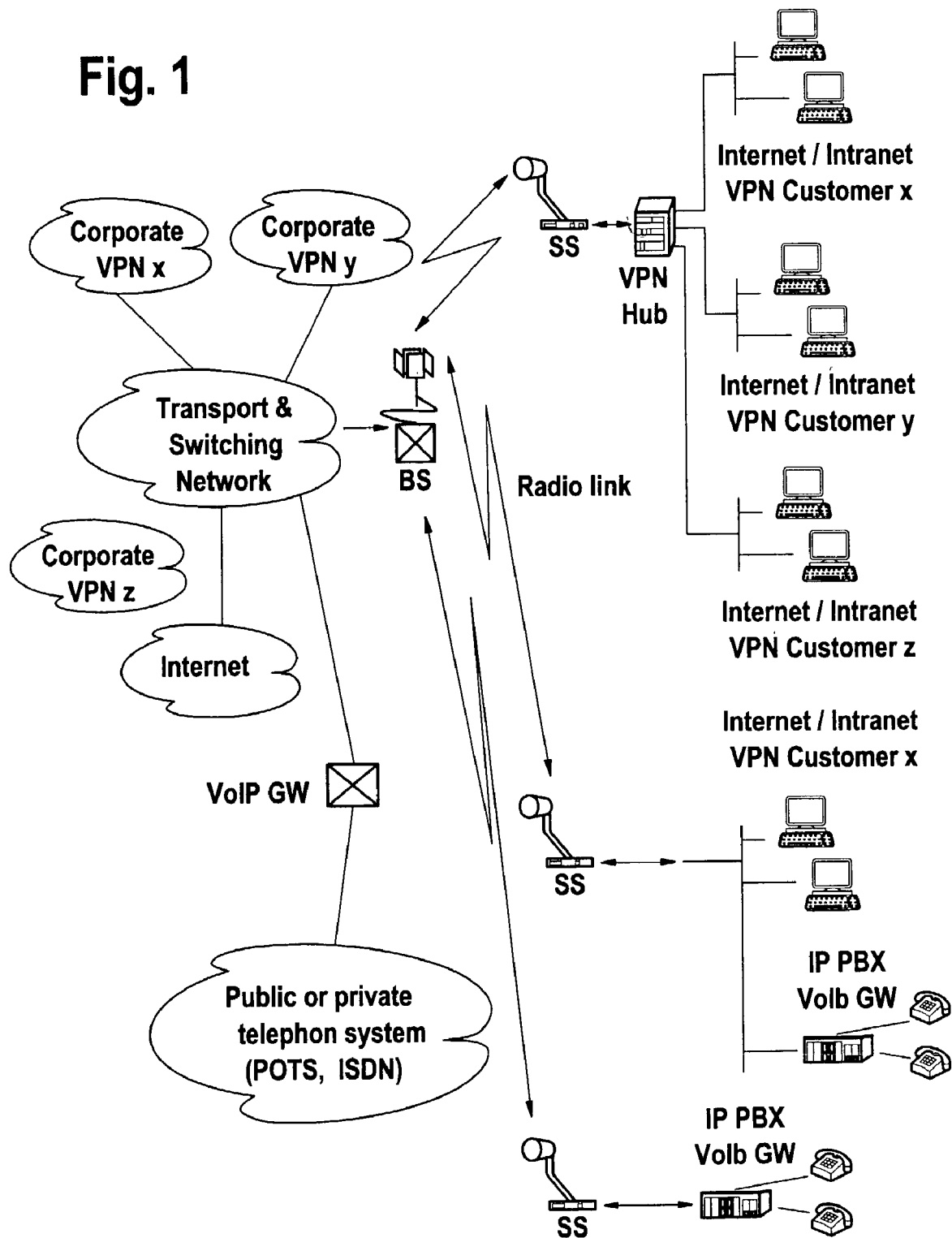
FIG. 1 shows an overview of a Local Multipoint Distribution System.

FIG. 1 shows an overview of a Local Multipoint Distribution System.

The interface between the backbone network and the radio links is provided by the base station BS. On the customers side, the subscriber station SS provides the interface between the radio link and the customers network. The LMDS is a multi service platform which allows a mix of bursty data services and constant bitrate services; in the described embodiment the network layer is based on IP. Different Quality of Service (QoS) classes are supported to provide the necessary quality depending on the applications requirements. For example a real time voice application requires lower delay and delay jitter than a file transfer. The Differentiated Services architecture is used to transfer the various data flows within the appropriate service classes.

The MAC protocol allows to share the radio channel resources in an optimum way. Especially in the direction from customers to the base station, where the radio channel is used by more than one customer, the MAC protocol resolves contention and bandwidth allocation. The MAC protocol provides access to the radio channel depending on the QoS demands of the various concurrent applications competing for the same medium.

In FIG. 1 an example is shown where some distributed customers have access to a transport and switching network by the use of radio links and so have access to the internet, their private intranet (VPN), and to the public or private telephone system. In the example the customers x, y, and z have access to the radio link by a shared SS which guarantees that the different connections get the required QoS and they do not disturb each other. Some customers in the example also have a high speed internet access, which usually requires an unsymmetrical connection with much more bandwidth in downstream than in ustream direction and which usually does not require such high quality of service than the Voice over IP application by which some customers in the example have access to a private or public telephone system.

IP Based LMDS Requirements:

The requirements for an IP based LMDS system can be shortly summarized as follows:
   Quality of Service for legacy and QoS aware IP Applications
   Support of Differentiated Service
   LMDS system
   Support of multiple users and user groups with independent contracts on the same SS LAN interface.

Support of policy functions per IP flow and Service Flow ID

SS mode can be GPT (grants per terminal) or GPC (grant per connection)

Fast and fair resource distribution respecting the service priorities

Convergence Sub-Layer (CSL) Functions:

The convergence sub-layer encapsulates the offered data packets into a CSL packet which allows the MAC layer to tunnel various higher layer traffic types. The CSL function is common for uplink and downlink. This documentation concentrates on the encapsulation of the IP packets into Convergence Sub-Layer (CSL) packets.

Figure 2:
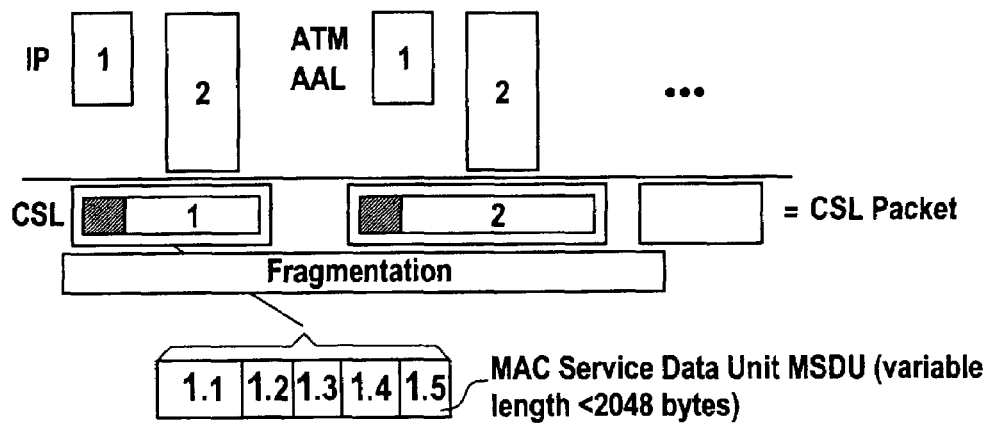
FIG. 2 illustrates the function of the Convergence Sub-Layer (CSL).

The fragmentation is the process by which a portion of a convergence sub-layer payload is divided into two or more MAC PDUs (FIG. 2). The derived MAC Service Data Unit (MSDU) length may be variable to allow efficient use of available bandwidth (uplink).

FIG. 2 illustrates the function of the Convergence Sub-Layer (CSL). The CSL Packets are drawn as black coloured framed boxes. They consist of a CSL header.

MAC Layer Functions:

In the downstream and uplink direction the MAC layer function (FIG. 3) block receives fragments (MAC Service Data Units) from the CSL packets accompanied by the required control signals (Connection ID CID, Fragmentation Control FC, Fragment Sequence Number FSN) and fits these into the MAC PDUs.

Figure 3:
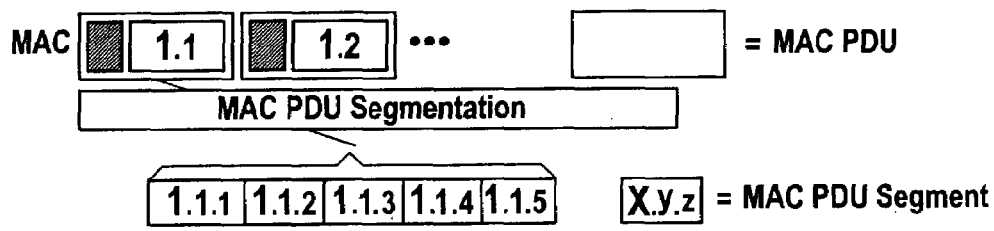
FIG. 3 shows how MAC Service Data Units are inserted into MAC PDU.
Figure 3:
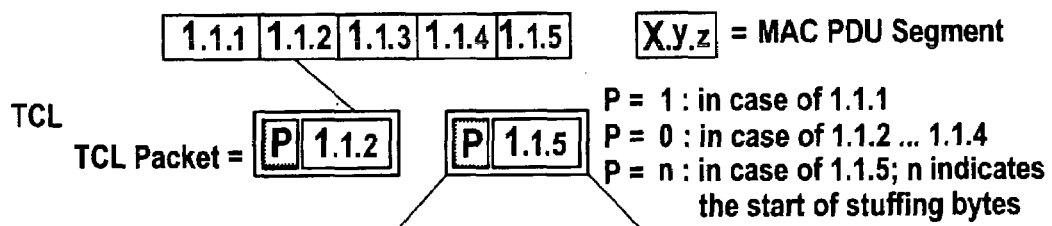

FIG. 3 shows how MAC Service Data Units are inserted into MAC PDU.

TCL Layer Functions:

The MAC PDU will be segmented into segments which fit into the codeword. Byte stuffing is used if the (last) segment is too small (see FIG. 3). The segments are inserted into TCL packets together with a pointer which indicates whether the TCL packets carries the first or a following MAC PDU segment. If the TCL packet which carries the last MAC PDU segment contains stuffing bytes the pointer marks the first stuffing byte.

Figure 4:
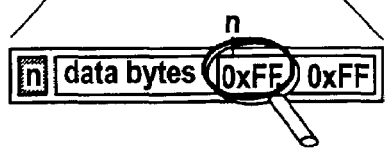
FIG. 4 shows the Transmission Convergence Layer.

FIG. 4 shows the Transmission Convergence Layer.

Physical Layer Functions:

This embodiment concentrates itself on the FDD/TDM variant, because it is seen as the most interesting variant. The TCL packets are encoded with an coding strategy defined within burst description tables. The selection of the applied burst coding is performed using an index (called Downlink Internal Usage Code-DIUC) in a Downlink Map (DL-MAP). The downlink burst (FIG. 5) is then scrambled and mapped into symbols also according to the burst description. The resulting PL Symbol Codeword is mapped into the Downlink Frame at the appropriate position. This Downlink Frame has two mandatory and variable sized fields (Phy and MAC) followed by optional and variable sized payload areas for 4 QAM, 16 QAM and 64 QAM.

Figure 5:
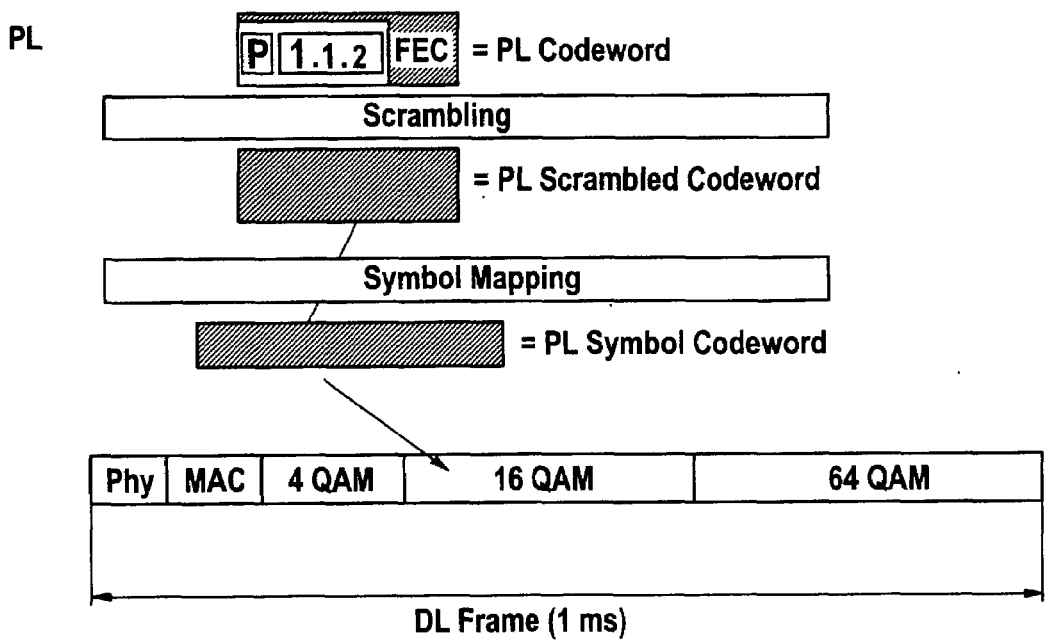
FIG. 5 shows the Physical layer functions for the downlink.

FIG. 5 shows the Physical layer functions for the downlink.

Figure 6:
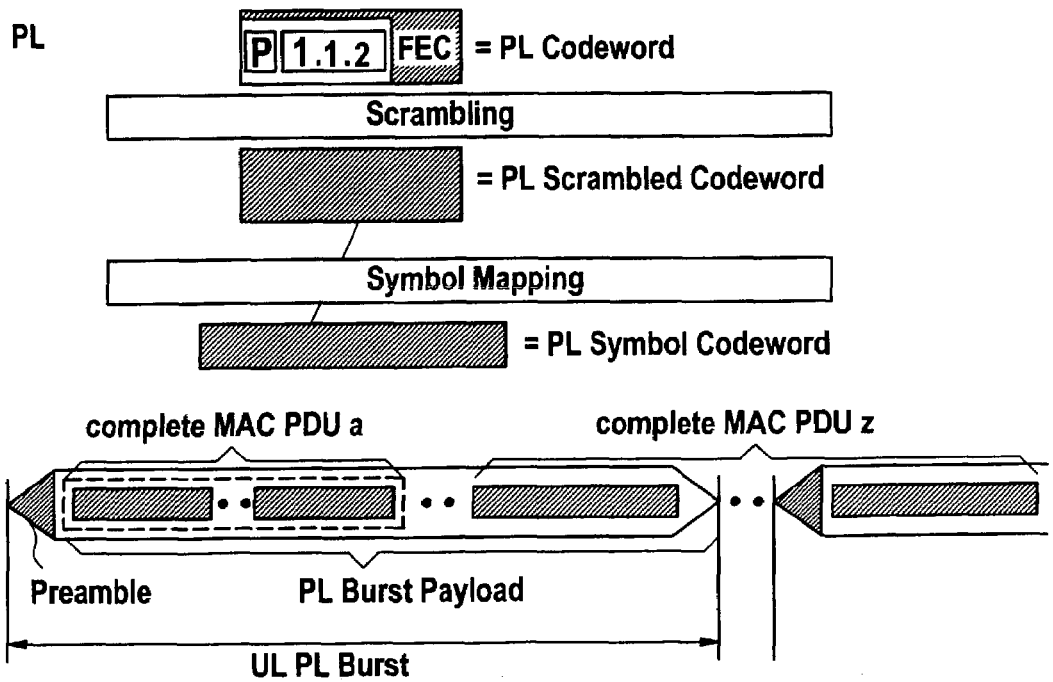
FIG. 6 shows the physical layer functions for the uplink.

FIG. 6 shows the physical layer functions for the uplink.

It is very similar to those of the downlink with the exception that the PL Symbol Codeword(s) are inserted in UL PL Burst. The burst description is also given by burst description tables which are indexed by an Upstream Internal Usage Code (UIUC). Within an Uplink Map MAC Message located in the MAC control field of the downlink frame the SS gets their grant information. This grant information provides the Connection ID, UIUC and the uplink burst size. MAC PDU may be transported within multiple uplink bursts.

Figure 7:
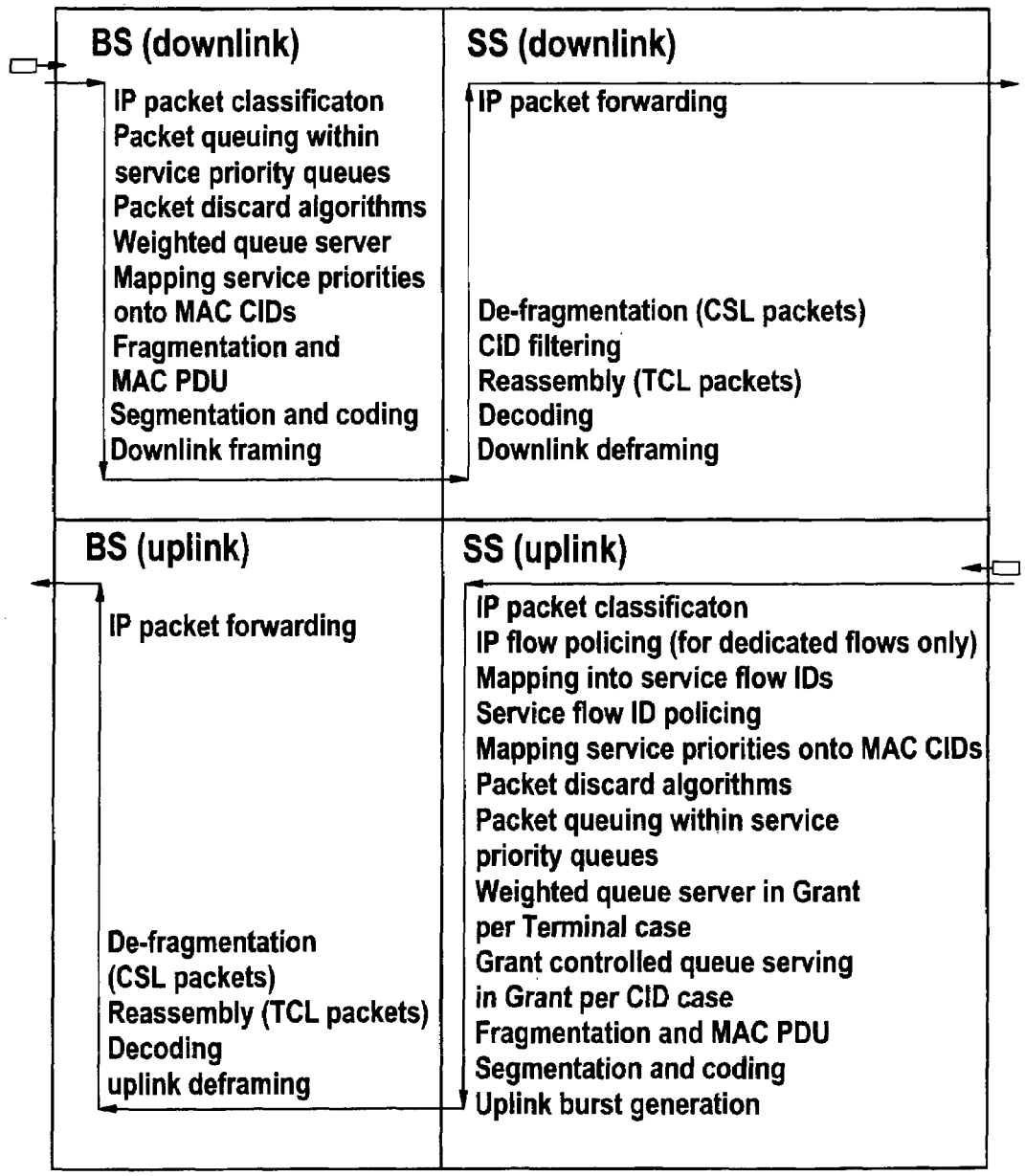
FIG. 7 shows a functional overview of the BS and SS.

Overview of the BS and SS Functions:

FIG. 7 provides a functional overview of the BS and SS separated into the downlink and uplink data path. Functions which have an major influence on the QoS behaviour of the LMDS system are printed in bold. The figure shows four quadrants, including the main (data flow related) functions.

Following the downlink or uplink arrows, the processing ordering can be seen.

Figure 8:
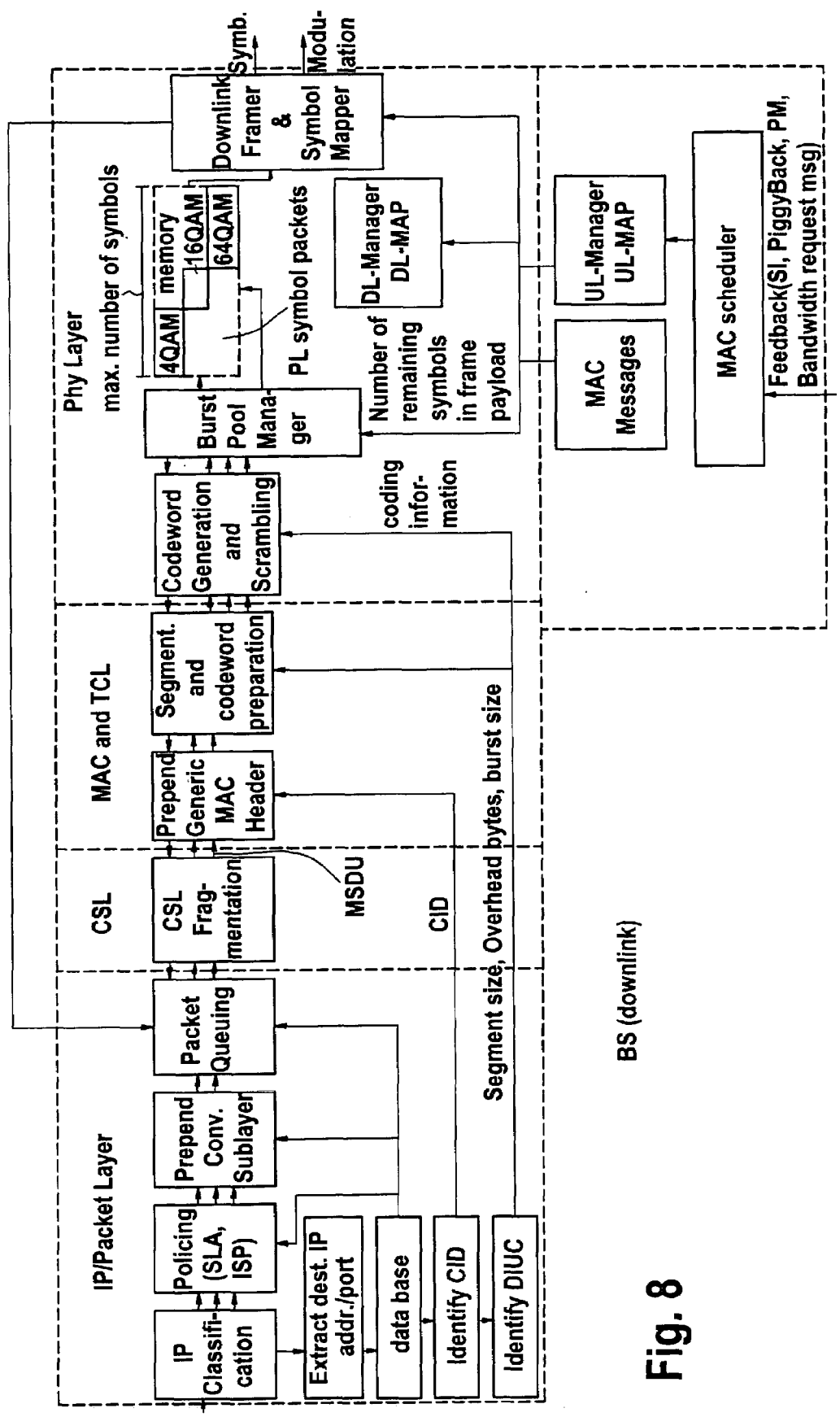
FIG. 8 shows the inventive Base Station downlink functional blocks.

BS Downlink Functional Specification (SW):

The IP based Base Station is shown in FIG. 8. It includes of the following main functional blocks:

IP/Packet layer block

Within this functional block the received IP packet from the core network will be first classified using dedicated header field(s) of the IP and/or transport protocol (UDP, TCP)—layer 3 and 4 processing. The IP packet classification is performed by addressing a data base using the extracted information. The so classified IP packet is forwarded to a Convergence Sub-layer block which prepends an IP packet individual header. This allows a generic treatment in the following processing steps of this Convergence Sub-layer packet independent of the carried protocol (IP, ATM, . . . ). This packet is stored into the dedicated packet queue corresponding to a dedicated service priority/class. In case of congested queues a packet discard algorithms decides on the acceptance of the packet. The downstream frame payload field is filled with data from the service priority queues. A weighted queue server decides on the order in which data segments are taken out of the queues.

Convergence Sub-Layer (CSL) block

In a pure IP based system the convergence sub-layer block has no functionality. Nevertheless, it is supposed that this block will frame the IP packets into a CSL-packet by pre-pending a CSL header, which allows to distinguish between different protocols. The pre-pending of CSL header functions is moved into the IP/Packet layer block due to the common packet queuing requirement of all protocol packets. The CSL fragmentation function remains within this processing block.

MAC layer block

A further outcome of the IP classification is the MAC Connection ID. The (IP) packets will be transferred within this MAC connection. The MAC block receives the (IP) packet fragments and inserts them into MAC PDU payload while the MAC CID are put into the corresponding MAC PDU header field. Furthermore, fragmentation control and sequence number are added into the MAC header to allow a re-assembly of the CSL packet.

Transmission Convergence Layer

The MAC PDU received from the MAC block can not be transmitted uncoded over the air interface. Therefore, the TCL has to segment the MAC PDU into data portions which fit into codewords. There are multiple codings defined which can be applied on arbitrary TCL segments.

Physical Layer

The physical layer function comprises the codeword generation and codeword scrambling. These codewords have to be multiplexed into the downlink frame together with the MAC message codewords and physical layer message codewords. Codewords transferred with the same modulation type are grouped according to the framing. The group size in number of symbols are not known in advance and are defined by the offered load and the corresponding burst descriptors. During transmission of the previous frame the downlink framer and burst pool manager build up the subsequent downlink frame. The symbol mapper converts the codewords, which are stored in physical layer memory as bytes, into symbols determined by the modulation type.

MAC Layer Management

The priority provisioning resource scheduler for uplink bandwidth allocation is the main functionality within the MAC layer management block. The MAC resource scheduler has to support the five specified service priorities and the different feedback mechanisms (slip indication, piggybacking, poll me indication, burst request messages). It is the key functionality for the resulting QoS provisioning in the upstream direction. The communication interface towards the subscriber station is constituted via the UL-Map messages. These UL-Map messages have to be inserted into each downlink frame.

The DL-Map messages are generated within the MAC layer management block. These messages indicate the actual structure of the downlink frames which vary with the offered traffic.

A further MAC message queue gathers all other MAC functionalities as power and delay ranging, channel management, registration management, dynamic service management. These messages are also inserted into the PHY and MAC control fields of the downlink frame.

FIG. 8 shows the Base Station downlink functional blocks.

IP/Packet Layer Functional Block:

The main IP layer functions are the IP classification and the IP queuing for data rate adaptation. The IP classification extracts different fields from the IP header. In case of IPv4 these fields are:

protocol

IP source and destination address (layer 3)

source and destination port of the transport protocol (layer 4)

Using one or several of these values a data base is addressed which provides all the relevant information required in the further layers of the BS downlink, as MAC, transmission convergence and physical layer. Within the IP layer functional block, Quality of Service parameter received from the data base are used to identify the service priority level. The service priority level determines the priority queue located in the "IP queuing" sub-block, where the received IP packet is stored in. These priority queues are required to minimise the delays and/or packet loss for the high priority services. IP packets belonging to the best effort service, or IP packets which have no specific entries within the data base, will always be stored in the lowest priority queue.

The minimum content the data base has to provide is the Connection ID (CID) required for the MAC layer PDUs and the corresponding downlink burst information referenced via the Internal Usage Code (DIUC). The QoS parameters are supposed to be "best effort" as default. In case of no entry within the data base for a received IP packet, this packet is dropped. IP routing protocol and address resolution protocol required to determine the IP routing information for the data base information are not mentioned here.

The burst pool manager of the physical layer controls the forwarding of the IP packets. By this, the physical layer sub-block adapts the read datarate of IP packets to the actual downlink bitrate (back-pressure algorithm). The physical layer sub-block which generates the downlink frame for the following frame period, requests the required payload data from the IP Queuing sub-block. The IP Queuing sub-block performs the priority decision and forwards data segments and the required control signals in the way that the intermediate sub-blocks can generate the correct codewords for insertion into the downlink frame.

IP Classification:

Packet (IP packet) classification at the ingress of the BS (downlink) is a major functionality for providing dedicated QoS characteristics to the individual or aggregated IP flows. The classification is performed on one or several fields of the IP header (Differentiated Services—DS, protocol, destination address, traffic class, flow label) of the IPv4 or IPv6 packet and/or the UDP or TCP destination ports. Using these information fields to address the data base the IP classification sub-block receives the information for flow classification and MAC, TCS, and PHY layer information required. The default QoS classification is "Best Effort". All "Best Effort" packets are stored in the lowest serving priority queue of the IP Queuing sub-block.

Policing:

The policing function is required to measure and to limit the downlink data. In case of a multi-provider environment sharing the downlink bandwidth, it is necessary to supervise the contract compliance of each service provider. The policing module has to drop data packets or to set drop precedence if the offered load exceeds the contract. Besides the policing of the service provider traffic, it may also be necessary to police the user traffic on the agreed Service Level Agreement (SLA).

Packet Queuing:

Due to the definition of adaptive modulation and variable FEC in the downlink direction of an LMDS system, the resulting downlink payload datarate is always varying, because the amount of symbols carrying 64 QAM, 16 QAM or 4 QAM in a downlink frame and the FEC overheads of the carried code words are continuously changing from frame to frame. Responsible for this variation is the possibility to define SS individual bursts with individual efficiency (payload bits per symbol). IP packets reaching their destination via different SS are transported within different bursts.

Therefore, the payload datarate is traffic and time dependent. In case where a lot of traffic load is transmitted towards SSs which are capable to receive 64 QAM compared to those who receive 16 QAM or 4 QAM, the average downlink bitrate is large. In worst case condition all SS can only accept 4 QAM, then the bitate is low. As a consequence of the above described downlink BS throughput variation and the independence between the MAC layer of the LMDS and the IP layer of the connected core network the rate adaptation and QoS respecting queuing can not be performed by the adjacent edge router/switch. Therefore, the LMDS system has to add an IP queuing functionality at their ingress to adapt the different bitrates.

FIG. 8 shows a base station for a point-to-multipoint radio network, in particular LMDS, including an inter-layer framer, the inter-layer framer including a series connection of a queuing module (IP Queuing sub-block) and a downlink framer, the downlink framer having a feedback loop to the queuing module to stepwise transmit the actual number of unused symbols in the next frame to be transmitted via the downlink, and the queuing module being capable to stepwise decide which information packet to be forwarded to the downlink framer in order to include the information packet into the next frame, the decision being dependent on the actual number of unused symbols received by the downlink framer.

In an advantageous embodiment of the invention the queuing module includes at least two queues to intermediately store different prioritized quality of services parameters, and the queuing module is being capable to decide which information packet to be forwarded to the downlink framer in order to include the information packet into the next frame, the decision being dependent on the actual number of unused symbols received by the downlink framer, the priority of the quality of services parameters, and the length of the corresponding intermediately stored information packets to be forwarded.

Figure 9:
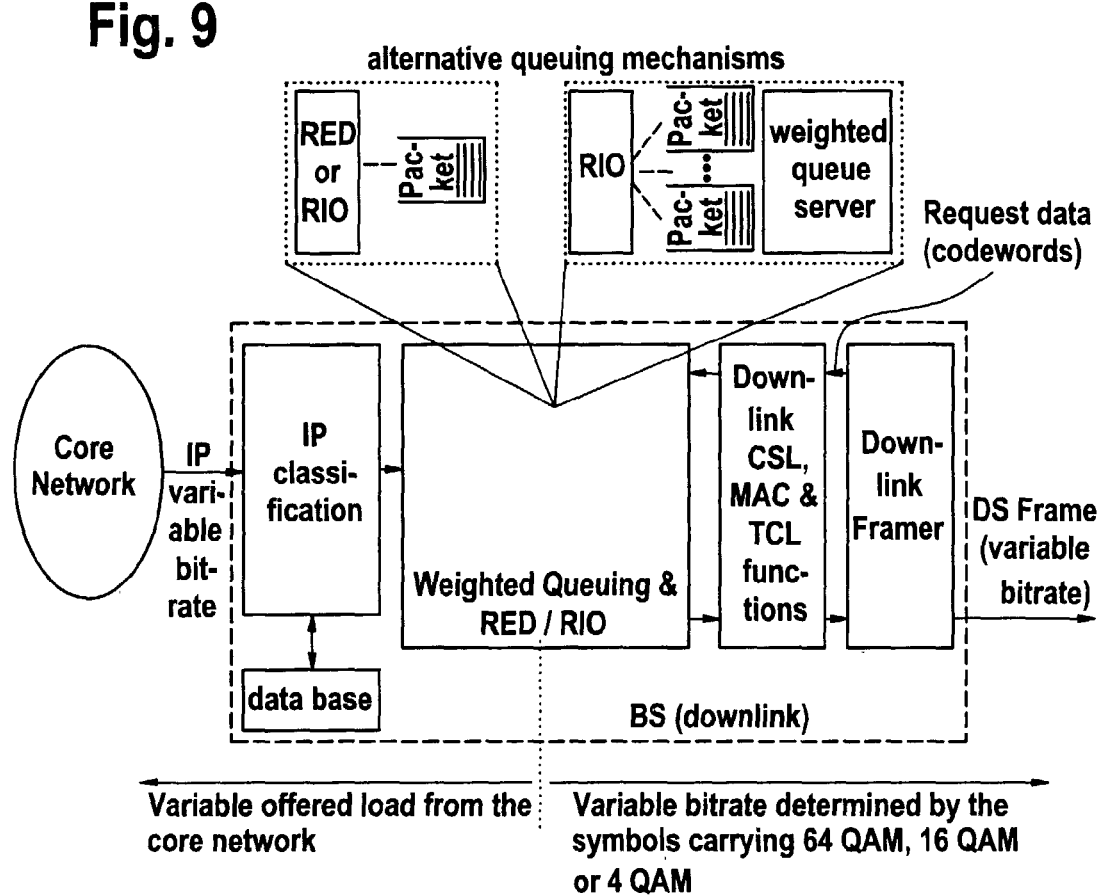
FIG. 9 shows the Queuing Mechanisms.

FIG. 9 shows the Queuing Mechanisms.

Buffering alternatives to achieve the bitrate adaptation:
using a single FIFO queue (including packet discard mechanism)
multiple service class FIFO queues (including packet discard mechanism)

Alternative 1 is the simplest solution for bitrate adaptation, but it has the major drawback that real-time and best effort IP packets are stored in the same FIFO queue. This means that delay sensible applications can not be served with priority to minimise the queuing delay. Even if advanced packet discard mechanism are applied, this principle drawback remains.

Therefore, alternative 1 is not sufficient to guarantee delay and delay jitter requirements of real-time services and hence will not be evaluated in the coming simulation phase.

In the following three major packet discard mechanism (often also queuing algorithms or congestion control algorithms called) are mentioned and will be briefly introduced. These mechanisms are discussed and investigated in various applications in the literature. These mechanisms are
Random Early Discard (RED) or
RED with In and Out (RIO) or
Tail-Drop with two drop precedence levels.

These mechanisms differ in the way how packets are selected to be dropped in case of "output port congestion".

Figure 10:
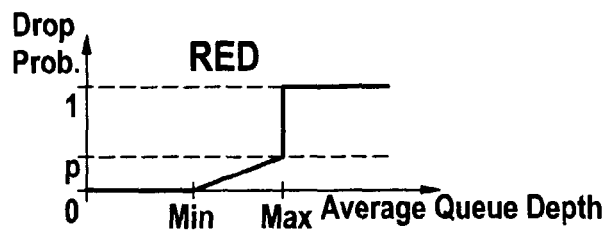
FIG. 10 shows a RED diagram.

FIG. 10 shows a RED diagram.

RED meters the average queue depth and defines two queue thresholds with different packet drop probabilities.

RED selectively drops packets with a probability given by the graph, where Min, Max and p are eligible parameters.

Figure 11:
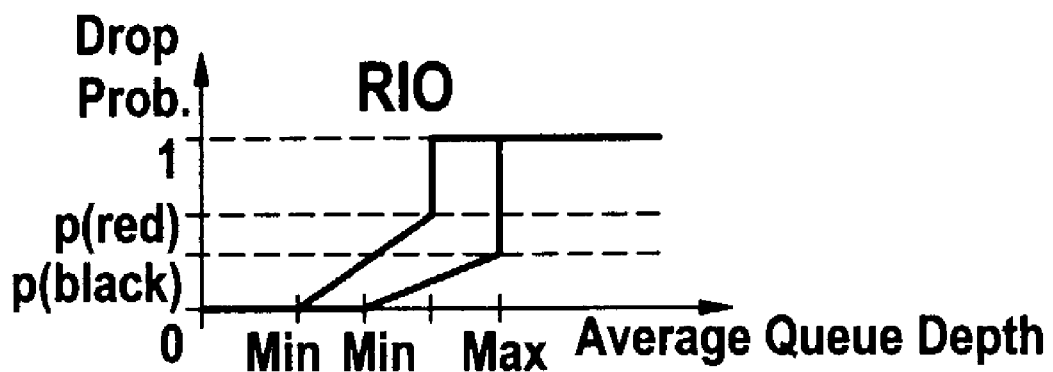
FIG. 11 shows a RIO diagram.

Advantages:
bursts are better supported compared to legacy queuing algorithms
smaller delays due to smaller average queue depth
fairer bandwidth distribution among TCP data flows Disadvantages:
no differentiation between over-subscribed flows and conforming flows
UDP traffic will dominate due to the interaction between RED and TCP congestion control FIG. 11 shows a RIO diagram.

The RED with IN and OUT (RIO) is similar to RED but it distinguishes between packet types where each packet type experience different drop precedence.

Depending on the application the packet types may be different in terms of IP transport protocol (TCP, UDP) or concerning the in-profile or out-of-traffic profile behaviour.

Figure 12:
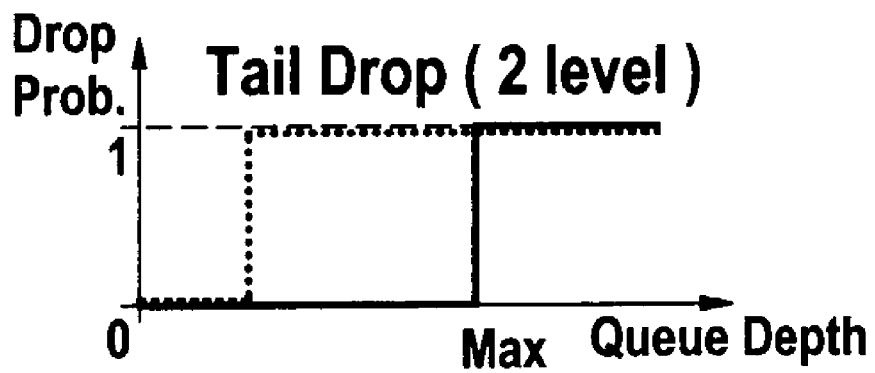
FIG. 12 shows a Tail Drop diagram.

Advantages:
concerning the drop precedence levels RIO is compliant to the proposed Assured Forwarding (DiffServ)
UDP traffic does not dominate the queue Disadvantages:
unable to distinguish packets on a per flow granularity
high implementation effort FIG. 12 shows a Tail Drop diagram.

The tail drop with two drop precedence levels is similar to the RED or RIO. The packets are dropped using a step function. It proposes to use the queue depth instead of the average queue depth.

Advantage:
low implementation effort

Disadvantage:
requires policing per flow for proper operation

Alternative 2 installs multiple queues (reasonable number are 2 to 4 queues) together with a weighted IP packet queue server and one of the packet discard algorithms. Based on the IP classification the IP packets are forwarded into the corresponding service queues. Queuing algorithms take care that the queue filling states are most likely low. Due to queue individual drop probability functions the delay can be adapted to the service. Furthermore, the weighted queue server determines serving priority, using two mechanisms. The first mechanism serves a non empty higher priority queue always first. The second mechanism defines a relative serving probability for non empty queues. Hereby, it is assured that best effort IP packets will not be forgotten if there is always traffic in the higher priority service queues.

The queue server has only to decide if two or more completely and correctly received and stored (IP) packets are waiting in the different packet queues. An actual transfer of a low priority (IP) packet can be interrupted by the transfer of an higher priority (IP) packet towards the CSL sub-block if both packets belong to different CIDs, because the MAC layer has no means to transport fragments of multiple packets in the same CID.

The queue server receives a value from the PHY layer sub-block which indicates the number of required data symbols to fill the downlink frame. From the early performed IP classification and data base access, the Packet Queuing function knows all the relevant information (CID, DIUC) to calculate the overhead bytes of the codeword and the selected modulation type. Applying this, the packet queuing reads the calculated number of data bytes out of the queue to generate a codeword. The queue server starts immediately with the generation of the next codeword until the number of requested data symbols for the downlink frame are provided. Towards the CSL sub-block it indicates the begin of a new packet, the packet type—in case the system is not pure IP based—and the CID—which allows the CSL to distinguish between interleaved packet fragments belonging to different CIDs.

CSL Functional Block:

The CSL sub-block indicates towards the MAC layer sub-block whether the delivered MSDU contains a complete packet or only packet fragment using the Frame Control (FC) signal. If it was only a fragment of a packet it indicates also the Fragment Sequence Number (FSN). The CID is also sent towards the MAC layer sub-block in parallel with the MSDU, FC and FSN.

MAC Functional Block:

The framer functionality controls the read out of packet (-fractions) from the Packet Queuing sub-block which has previously performed the service priority decision for this (fragment of) (IP) packet. To transport the packet on the MAC layer the MAC functional block performs the MAC frame encapsulation function.

TCL Functional Block:

The MAC PDU will be segmented into segments which fit into the codeword. Byte stuffing is used if the (last) segment is too small. The segments are inserted into TCL packets together with a pointer which indicates whether the TCL packets carries the first or a following MAC PDU segment. If the TCL packet which carries the last MAC PDU segment contains stuffing bytes the pointer marks the first stuffing byte.

PHY Layer Functional Block:

The physical layer functions comprise the coding sub-block which performs the Reed-Solomon or Turbo Coding depending on the burst descriptor. The detailed parameter for the coding function is delivered from the IP classification and data base sub-modules. After the coding is added to the TCL packet payload. The TCL packet is then scrambled using the scrambling definition. The derived PL scrambled codeword is forwarded into a burst pool memory. The burst pool memory is splitted dynamically into three areas representing the modulation types. In case of multiple codings per modulation type a further sub-division is required. For the FDD/TDM case the PL scrambled codewords with equal burst descriptors (modulation, coding, scrambling, . . . ) are grouped together in the downlink frame and therefore, they have also to be (logical) grouped in the burst pool memory. Each of these groups is announced within the DL-Map by indicating the burst descriptor (DIUC) and the physical slot start.

MAC Management Functional Block:

The major function within this block is the MAC scheduler which is also the focus of the further investigations within the case. The MAC scheduler generates the SS grants and the UL-Map manager inserts the received data grants into a valid UL-Map message.

Figure 13:
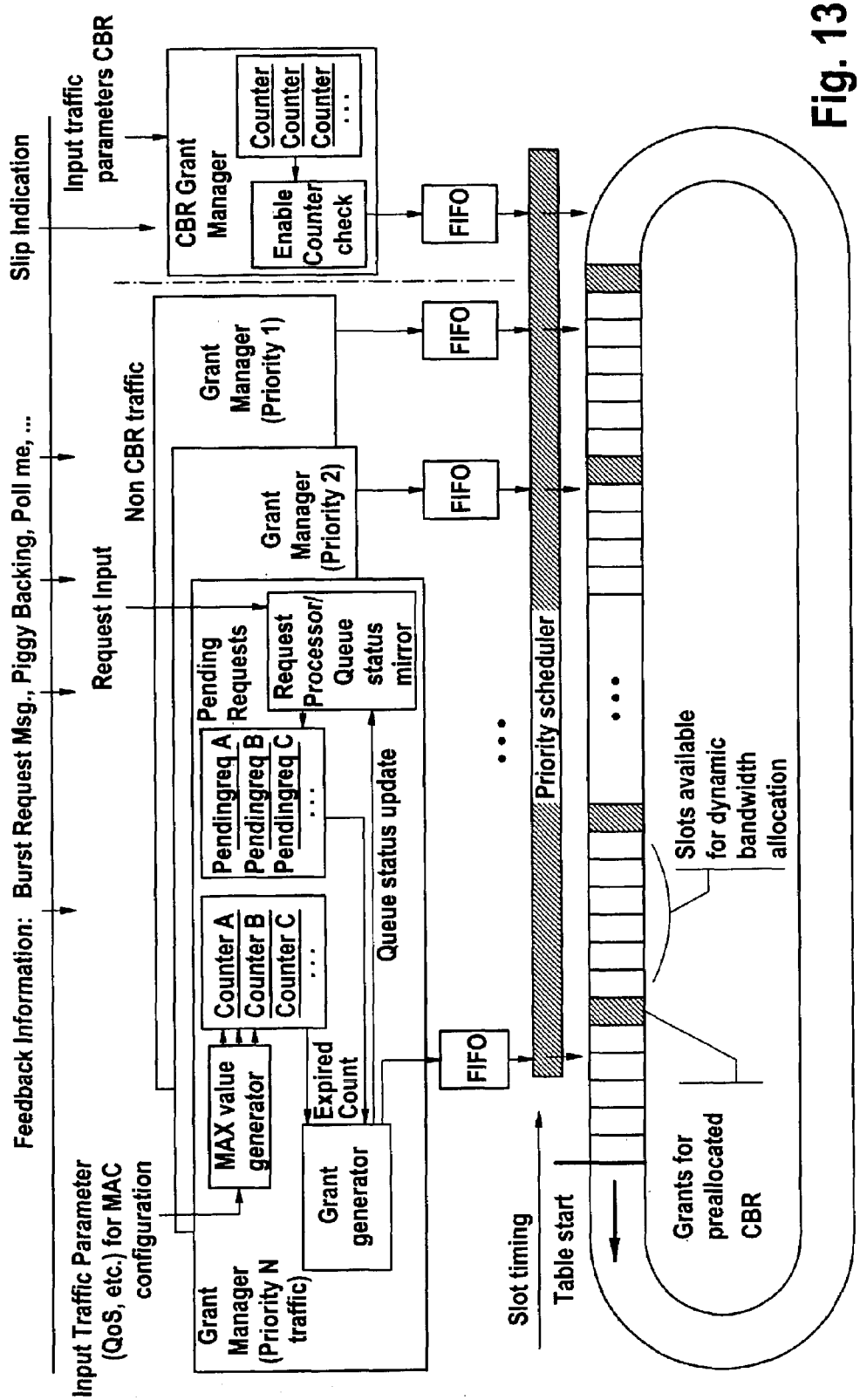
FIG. 13 shows a MAC Scheduler.

The principle scheme as shown in FIG. 13 provides a suitable basis on which to schedule data transmissions according to QoS criteria. It indicates that there are multiple independent scheduling functions (grant manager), one per priority level. Each grant manager has to be configured with the traffic parameters.

The various grant managers receive dedicated feedback informations from the SS. So for example the CBR grant manager producing UGS type grants gets the Slip Indication (SI) information from the SS if the CBR queue(s) exceeds a programmable threshold. Receiving a Slip Indication the CBR grant manager increases the grant rate slightly (about 1%) to slowly reduce the queue fill state and herewith the queuing delay of the data packets. For non CBR type traffic, there are different mechanisms defined to react appropriate and dynamically on bursty traffic sources. These feedback informations are forwarded to the corresponding grant manager to modify the grant rate.

The priority scheduler produces the data grants to be inserted into the UL-Map. Hereby, the different priorities of the data grants have to be respected.

The MAC scheduler has to distribute the grants in fair and QoS respecting way among all the SSs and the different service priorities.

The grant generation as well as the queuing algorithms have a strong influence on the TCP and UDP traffic performance and therefore requires a deep validation task.

Figure 14:
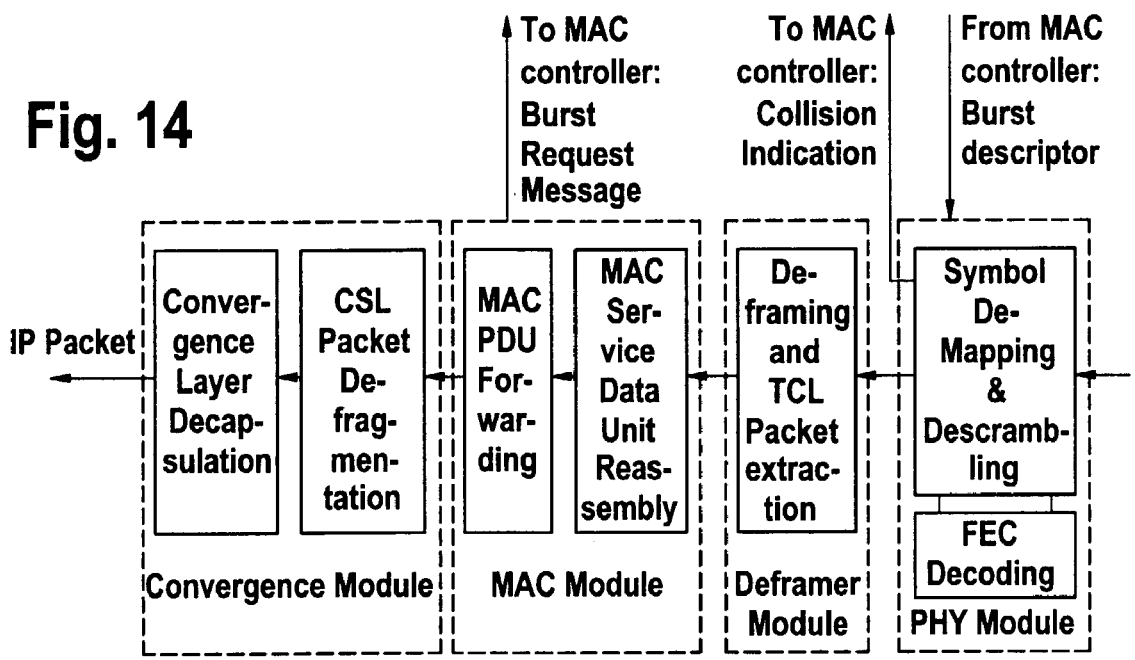
FIG. 14 shows the Base Station uplink functional blocks.

FIG. 14 shows a MAC Scheduler.

BS Uplink Functional Specification:

The functional description of the BS uplink supposes that the transmission convergence layer is enabled and that the available bandwidth in the connected backbone network is larger than the bandwidth on the uplink air interface. Therefore, the main tasks of the BS uplink are to retrieve the IP packets and send them with minimum delay towards the backbone network. Furthermore, two major MAC relevant information have to be extracted out of the uplink data stream. One is the collision indication in the BW Request Contention area (see FIG. 15) of the uplink burst sub-frame structure. This information is mandatory to allow the MAC scheduler to identify that several Burst Request Messages have been sent simultaneously and to start the contention resolution process for a fast provisioning of uplink bandwidth towards the competing SS. The other major MAC relevant message is the MAC Request Message itself which tells the MAC scheduler about the number of waiting mini-slots within a SS. The MAC scheduler processes this information and provides bandwidth to this SS as soon as the higher priority requests are served.

FIG. 14 shows the Base Station uplink functional blocks.

The Base Station processes in the uplink functional blocks the extraction of TCL packets out of the uplink bursts. Within the MAC module these TCL packets are re-assembled to get the MAC PDU. Lost TCL packets lead to uncomplete MAC PDU which are dropped. The MAC module performs also routing on the Connection ID (CID) to identify the MAC relevant MAC PDU which have to be forwarded towards the MAC manager.

The convergence module de-fragments the received MAC Service Data Units and removes the convergence sub-layer header. The retrieved IP packets is forwarded towards the IP based backbone.

Figure 15:
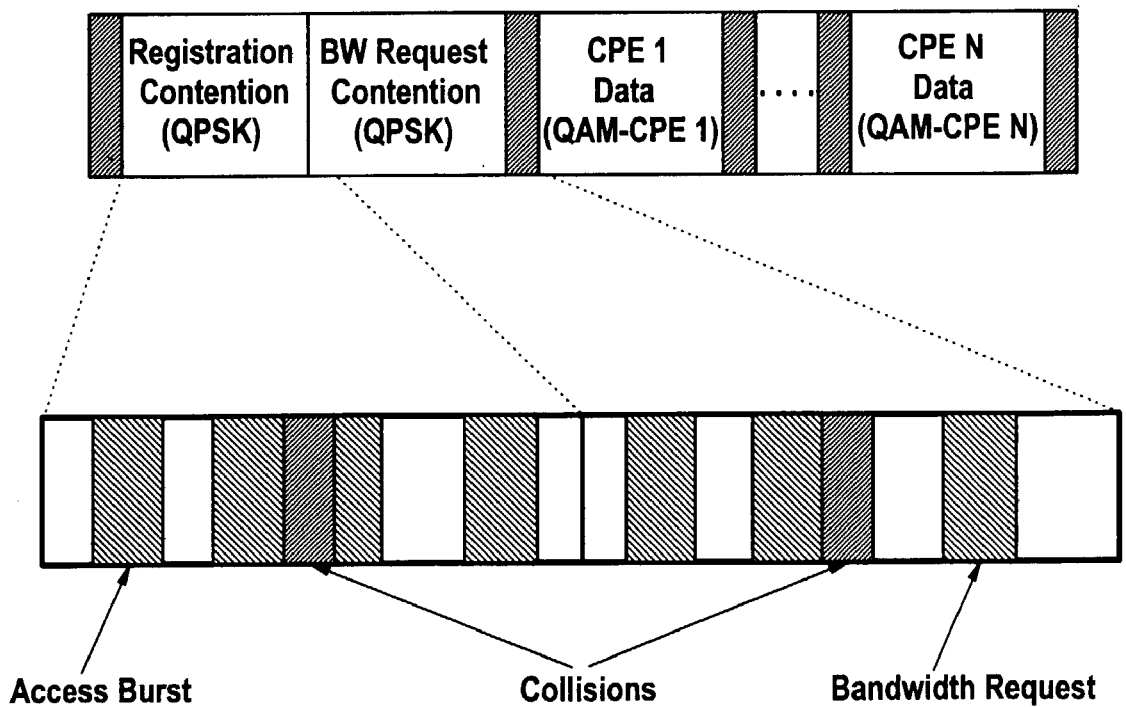
FIG. 15 shows the PHY Uplink Burst Subframe Structure.

FIG. 15 shows the PHY Uplink Burst Subframe Structure.

Figure 16:
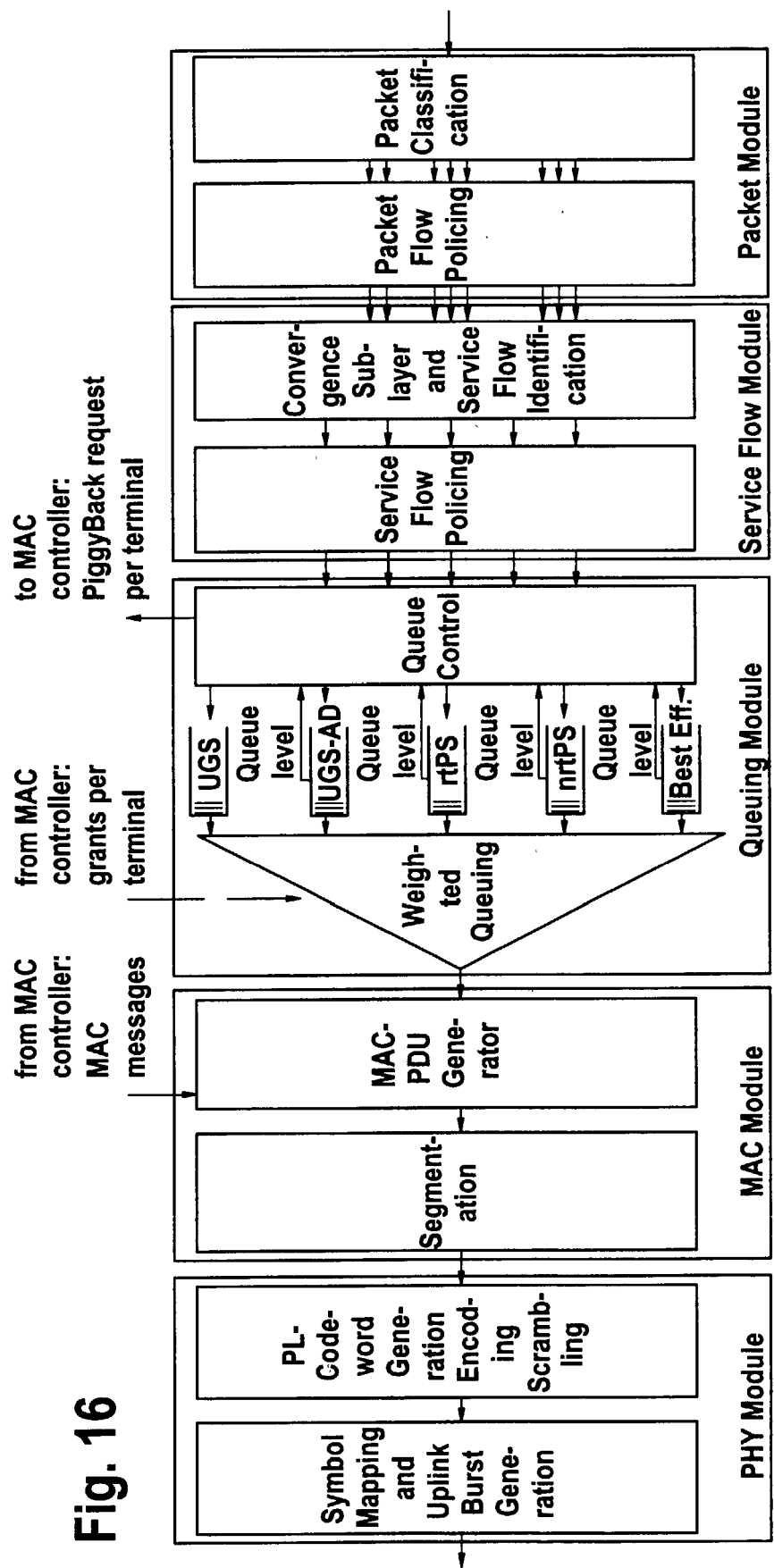
FIG. 16 shows GPT mode Subscriber Station uplink modules.

SS Uplink Functional Specification:

Two different modes of operation for Subscriber Station (SS) are defined: Grants per Terminal (GPT) mode and Grants per Connection (GPC) mode. In the first case, bandwidth is granted to all the connections belonging to the SS, whereas in the second case the BS grants bandwidth explicitly to each connection. The GPC mode allows more intelligent SSs to take last moment decisions and perhaps utilise the bandwidth differently than it was originally granted by the BS as bandwidth steeling mechanism is allowed for some scheduling services. In the following the SS operating in the GPT mode will be described. FIG. 16 shows the SS in uplink direction modularised in the following functional blocks:

Packet Module

In an IP based system this functional block performs IP packet classification. For dedicated flows policing is performed which can result in a drop indication or even dropping of packets.

Service Flow Module

Within the Service Flow Module packet flows are associated into Service Flows. The concept of a Service Flow is central to the operation of the MAC protocol and provides a mechanism for Quality of Service management. Data is transmitted across connections. The mapping of Service Flows onto connections is also done within this module.

Queuing Module

Five different types of upstream scheduling services are defined and a dedicated queue is implemented for each service type. The connections are mapped into these priority queues. A weighted queue server decides which queue will be served and the size of the data segment which is taken out of the queue MAC Module The MAC Module receives data segments from the Queuing Module and prepends the generated MAC header comprising a. o. the connection ID.

PHY Module

FIG. 16 shows GPT mode Subscriber Station uplink modules.

Figure 17:
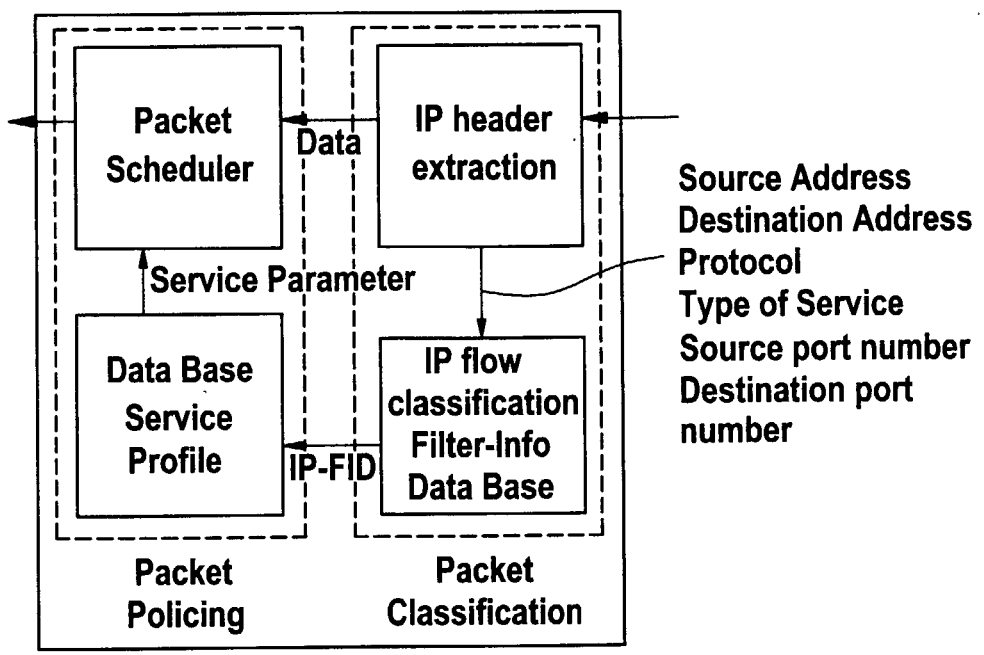
FIG. 17 shows a Packet Module.

Packet Module:

In an IP based system the Packet Layer Block receives IP packets from a behind located user equipment. To enable IP QoS mechanism in the system as Differentiated Services or Integrated Services a classification of the different IP packets for a following policing function is required. FIG. 17 shows the generally functional blocks required to enable IP QoS functionality.

The incoming packets are classified into different flows by extracting interesting fields of the IP header. In case of an IPv4 packet the source IP address and the TCP/UDP source port if available, in case of an IPv6 packet the source address and the flow label are sufficient to classify the packet. Based on these information the packets can be associated into IP flows. Furthermore with these information a database is addressed providing the service profile used in the Packet Policing functional block. Within this functional block the classified packet flows are monitored whether they are in conformity with the traffic contract given by the traffic profile. In case of non-conformity the packets are indicated by setting a drop indication flag. A dropping of the packets in this block is not mandatory as it is possible to achieve a multiplexing gain by merging several packet flows into one Service Flow later in the Service Flow Module. The drop indication is therefore necessary to determine the non-conformable packets for the later Service Flow Policing function.

Figure 18:
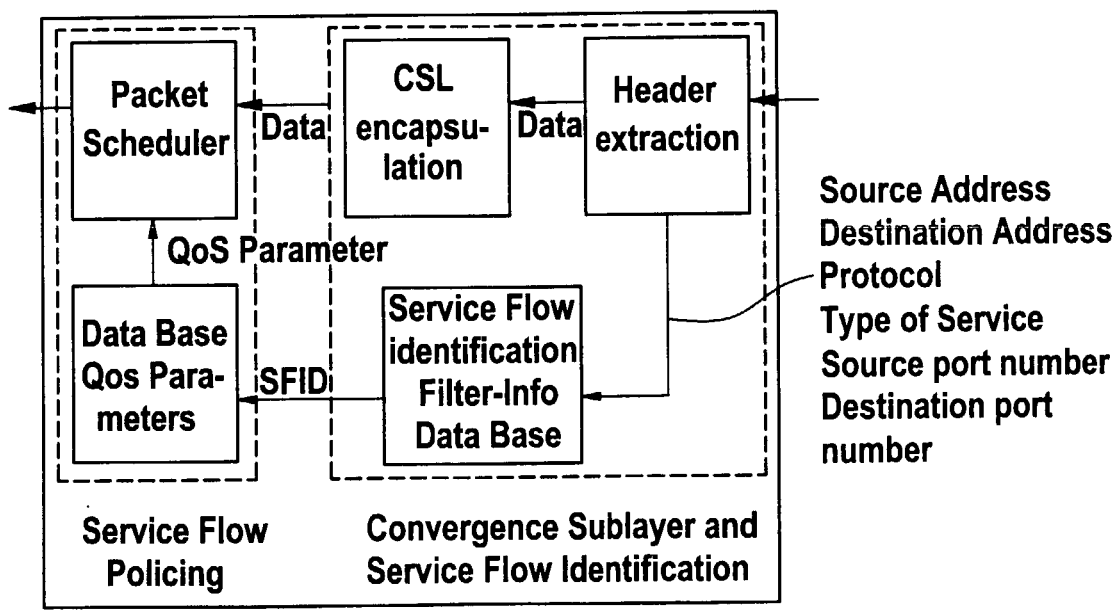
FIG. 18 shows a Service Flow Module.

FIG. 18 shows a Packet Module.

Service Flow Module:

Within the Service Flow Module the Convergence Sub-layer functional block (CSL block) is located. It is the task of this Convergence Sub-layer to map the IP packets to the connections and services of the MAC layer. IP packets coming from the Packet Module are encapsulated into CSL packets and mapped onto MAC transport connections based on the contents of the IP header. The CSL block accepts both, IPv4 and IPv6 packets. The mapping of packets into Service Flows is important as the concept of a Service Flow is central to the operation of the MAC protocol and provides a mechanism for Quality of Service management. Multiple packet flows can be served by a single Service Flow whereas each Service Flow is characterized by the following attributes:

Service Flow ID
Connection ID
QoS Parameter Set

An identification of the packet and assignment into the corresponding Service Flow is necessary as policing of the compliance with the agreed traffic parameters is done on the Service Flow level. The identification of the Service Flow an incoming packet belongs to is based on the contents of the IP header. The relevant IP header fields are listed in Table 1 for IPv4 and Table 2 for IPv6.

TABLE 1

IPv4 selectors

| Field in IPv4 header | Length | Search type |
| --- | --- | --- |
| Source Address | 4 Bytes | Longest Prefix Match |
| Destination Address | 4 Bytes | Longest Prefix Match |
| Protocol | 1 Byte | Exact Match |
| Type of Service | 1 Byte | Exact Match |
| Source port number | 2 Bytes | Range Match |
| Destination port number | 2 Bytes | Range Match |

TABLE 2

IPv6 selectors

| Field in IPv6 header | Length | Search type |
| --- | --- | --- |
| Source Address | 16 Bytes | Longest Prefix Match |
| Destination Address | 16 Bytes | Longest Prefix Match |
| Next Header | 1 Byte | Exact Match |
| Traffic Class | 1 Byte | Exact Match |
| Source port number | 2 Bytes | Range Match |
| Destination port number | 2 Bytes | Range Match |

The Service Flow identification function processes the extracted header information and yields to the Service Flow identifier (SFID). With the SFID a data base is addressed carrying the QoS parameters such as latency, jitter, and throughput assurances which are defined and reserved for that Service Flow. The data base delivers the requested QoS Parameter Set to the Packet Scheduler who takes care that the reserved resources are correctly assigned to the forwarding packets. Furthermore the Packet Scheduler has the task to drop packets which are not in conformity with their traffic contract. In this case the Packet Scheduler should first drop packets which have the drop indication flag set.

The CSL encapsulation function provides a uniform interface to the Service Flow Policing block and hides the different protocols by pre-pending the CSL header.

Figure 19:
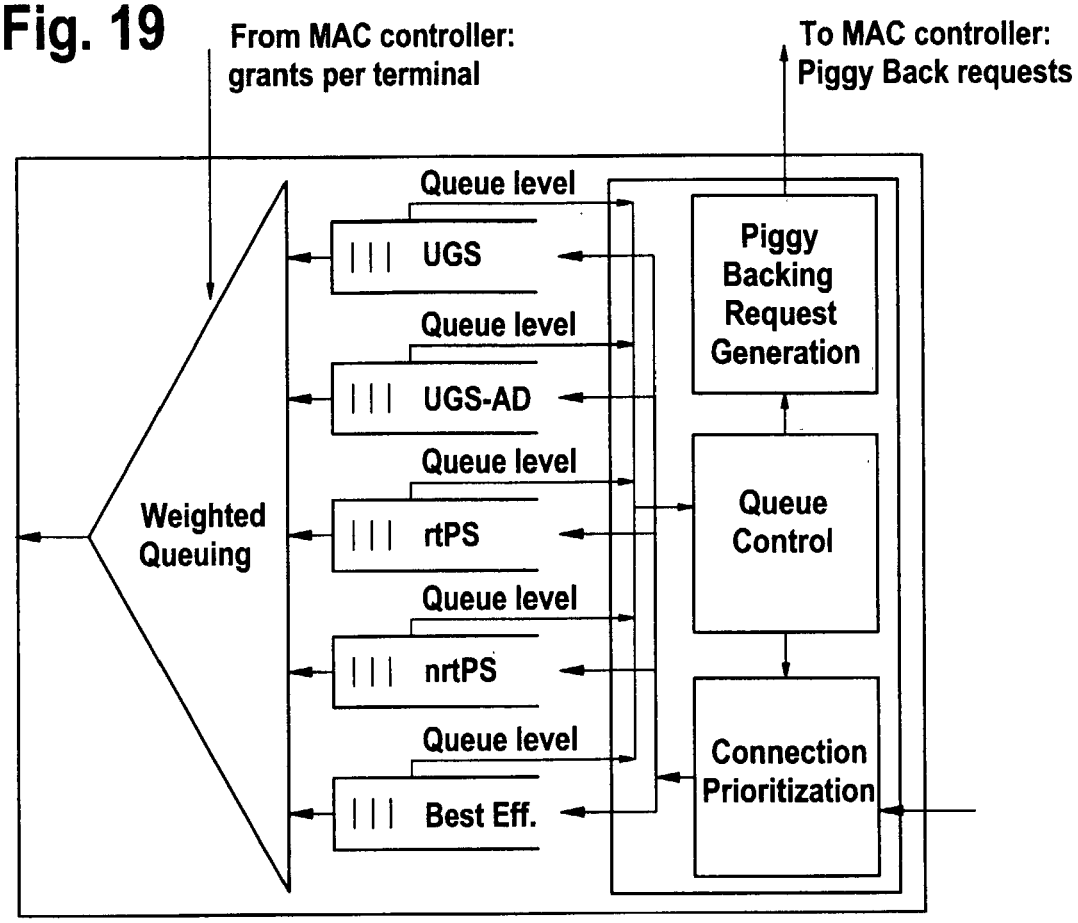
FIG. 19 shows a Queuing Module.

FIG. 19 shows a Queuing Module.

Queuing Module:

Five different types of upstream scheduling services are defined. Scheduling services are designed to improve the efficiency of the poll/grant process. Each connection is assigned to a dedicated scheduling service identified by the CID. Each service is tailored to a specific type of data flow. The basic services comprise:

Unsolicited Grant Service (UGS)
  Designed to support real-time service flows that generate fixed size data packets on a periodic basis (T1/E1, VoIP, . . . ). The service offers fixed size grants on a real-time periodic basis.

Real-Time Polling Service (rtPS)
  Supports real-time service flows that generate variable size data packets on a periodic basis (MPEG video), variable grant sizes for optimum data transport efficiency, and offers periodic, unicast request opportunities.

Unsolicited Grant Service with Activity Detection (UGS-AD)

Supports Unsolicited Grant Service flows that may become inactive for substantial portions of time (>x*10 ms; VoIP with silence suppression), provides UGS when the flow is active and unicast polls when the flow is inactive whereas flow inactivity is detected by unused grants. UGS-AD is a combination of UGS and rtPS—only one scheduling service is active at a time.

Non-Real-Time Polling Service (nrtPS)

Support non real-time service flows that require variable size data grants on a regular basis, such as high bandwidth FTP.

Best Effort Service (BE)

Provide efficient service to best effort traffic.

The Connection Prioritisation function maps the incoming CSL-packets based on the CID into the appropriate queue. The Queue Control block monitors the level in the different queues and decides if incoming packets have to be discarded. This queue control mechanism is important especially for connections in the low prioritised service classes e.g. best effort service as these connections cannot be policed due to the missing of traffic contracts.

Furthermore with the information about the queue level the piggy back requests are calculated subject to the queue. The piggy back requests are forwarded to the MAC Controller.

The order which queue will be served and the size of the data fragments which is taken out of the queue is determined by the Weighted Queue Server. The fragmentation of the CSL-packets which are waiting in the queues depends on the granted bandwidth for the next uplink burst. The MAC Controller provides the Weighted Queue Server with this information.

MAC Module:

The MAC Module has two functional blocks: The MAC-PDU Generator and the Segmentation functional block.

Within the MAC-PDU Generator the data received from the Queuing Module and the MAC messages received from the MAC Controller are encapsulated in MAC-PDUs. The information to build the MAC header is also provided by the said modules. The complete MAC-PDU then has to be segmented into the proper code-word size.

PHY Module:

In the PHY Module generates the PL-Codewords out of the MAC-PDU segments. These code-words are encoded and scrambled after.

Figure 20:
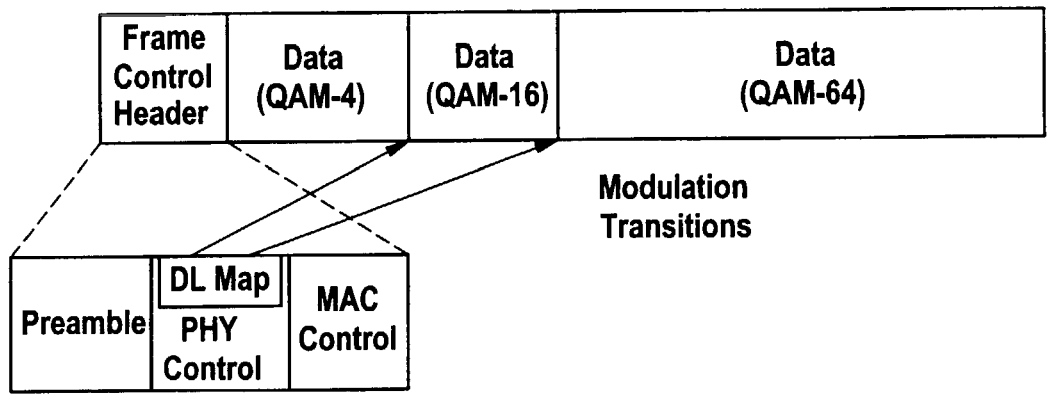
FIG. 20 shows a Downlink frame structure.

SS Downlink Functional Specification:

A downlink transmission frame (FDD/TDM case) is defined as shown in FIG. 20. Each Subscriber Station must be able to receive the 4 QAM modulated Frame Control Header (independent of the own modulation receive capability). The Frame Control Header contains the indication where the modulation changes. In the Data sections data and control messages are transmitted towards the specific SS. In the data field data packets with different kinds of modulation could be transmitted, e.g. QAM 4 and QAM 16. The borders between the data fields with different modulation can be dynamically changed.

FIG. 20 shows a Downlink frame structure.

Figure 21:
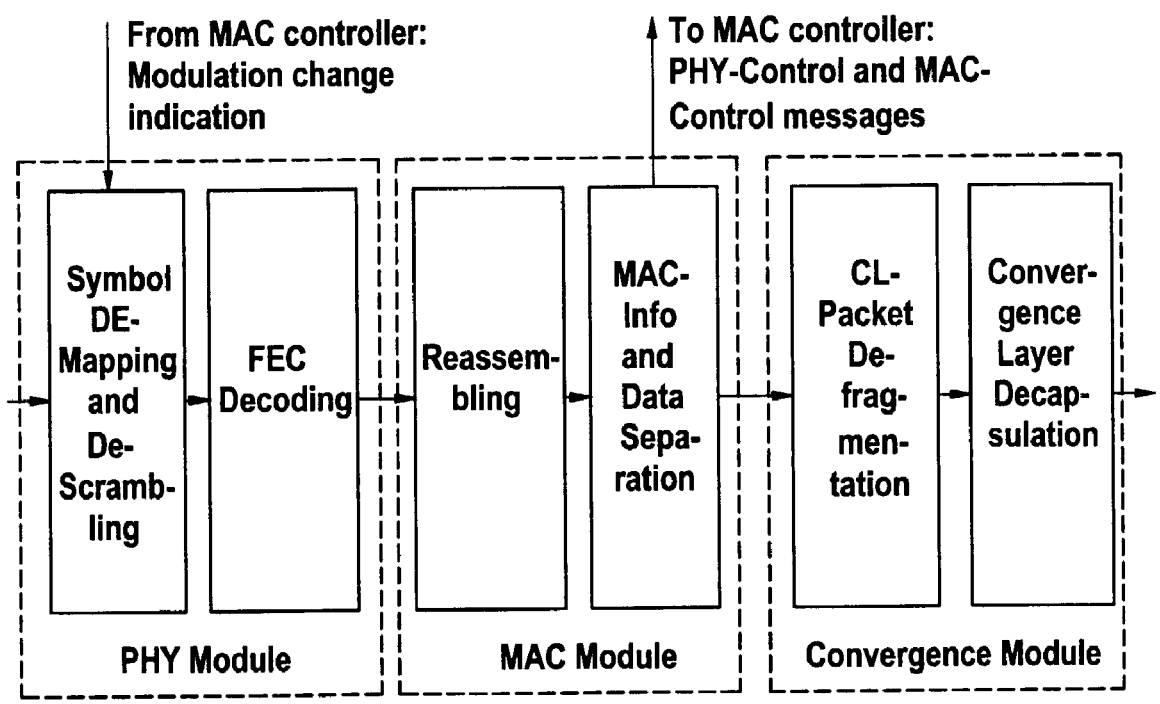
FIG. 21 shows the Subscriber Station Downlink Modules.

FIG. 21 shows the required modules to receive and process the transmitted data in downlink direction:
PHY Module
MAC Module
Convergence Module
FIG. 21 shows the Subscriber Station Downlink Modules.

PHY Module:

The PHY Module receives the DL-frame and performs symbol de-mapping of the QAM-4 symbols until it gets the indication from the MAC controller to change the modulation mode. The symbols will be accumulated until the amount of symbols for one PL-scrambled code word is received. Before the code word can be decoded the PL-scrambled code word is de-scrambled. The PHY Module forwards TCL Packets to the MAC Module.

MAC Module:

The reassembling functional block within the MAC Module collects the TCL Packets received from the PHY Module and compose the segments to MAC-PDUs. The following block distinguishes between Data MAC-PDUs and Control MAC-PDUs.

The Control-PDUs are forwarded to the MAC Controller. These PDUs carrying the following information:
PHY Control information
　Broadcast physical layer information
　Downlink-Map
　Frame numbering
MAC Control information
　MAC Version Identifier
　Uplink Map
Dedicated MAC messages
　Ranging messages
　Power Control messages
　Registration messages
The Data MAC-PDUs are delivered to the Service Flow Module.

Convergence Module:

The Convergence Module gets the MAC PDU and performs the re-assembly towards the CSL data packets. The de-capsulation function removes the CSL header and forwards the (IP) data packets towards the user terminal interface.

The invention provides an inter-layer downlink framer and is best suited for point to multipoint (downlink) access networks where guaranteed Quality of Service has to be provided for IP based applications and, simultaneously, the downlink bandwidth or data rate is continuously varying due to variable modulation and coding requirements.

Due to the fact that the downlink bandwidth or data rate is continuously varying in time because each downlink burst uses an network termination individual modulation and coding (Physical layer) scheme, the higher layer (IP) functions can not perform service priority respecting traffic shaping. The queuing function block within the base station has to buffer the offered traffic and to take into account the various service priorities and the framer functional block has to generate the downlink frame. The problem is that neither the framer knows anything on the QoS requirements of the offered load nor the QoS queuing knows something about the actual available downlink bandwidth. This leads to a loss of QoS in the downlink path.

A straight forward framer cannot support QoS for IP applications, because he does not know anything about the IP layer and a IP classifier. On the other hand the QoS queue server can not guarantee QoS, if he does not know anything on the actual amount of data bits which fit into the downlink frame.

The invention is based on an inter-layer framer which closes the information gap between a QoS queuing (higher layer) and the framer (lower layer).

The invention proposes mainly to combine both (framing and IP layer) functions within one inter-layer framer. The combination of both informations ensures QoS provisioning in case of multi-modulation and multi-coding environment. This is due to fact, that the QoS queue server gets always informed on the actual amount of available data frame bits from the framer and therefore, the QoS queue server is able to decide on the next IP packet or packet fraction to transport. This decision is always based on service priority aspects. As soon as the downlink frame is filled—supposing that the maximum downlink frame rate is always slower than the internal processing in the inter-layer framer—the QoS server stops the data delivery. At latest moment—means that there is sufficient time to fill the next downlink frame—the QoS server starts again to decide on and to deliver of the IP packets (fragments) for the next downlink frame.

Figure 22:
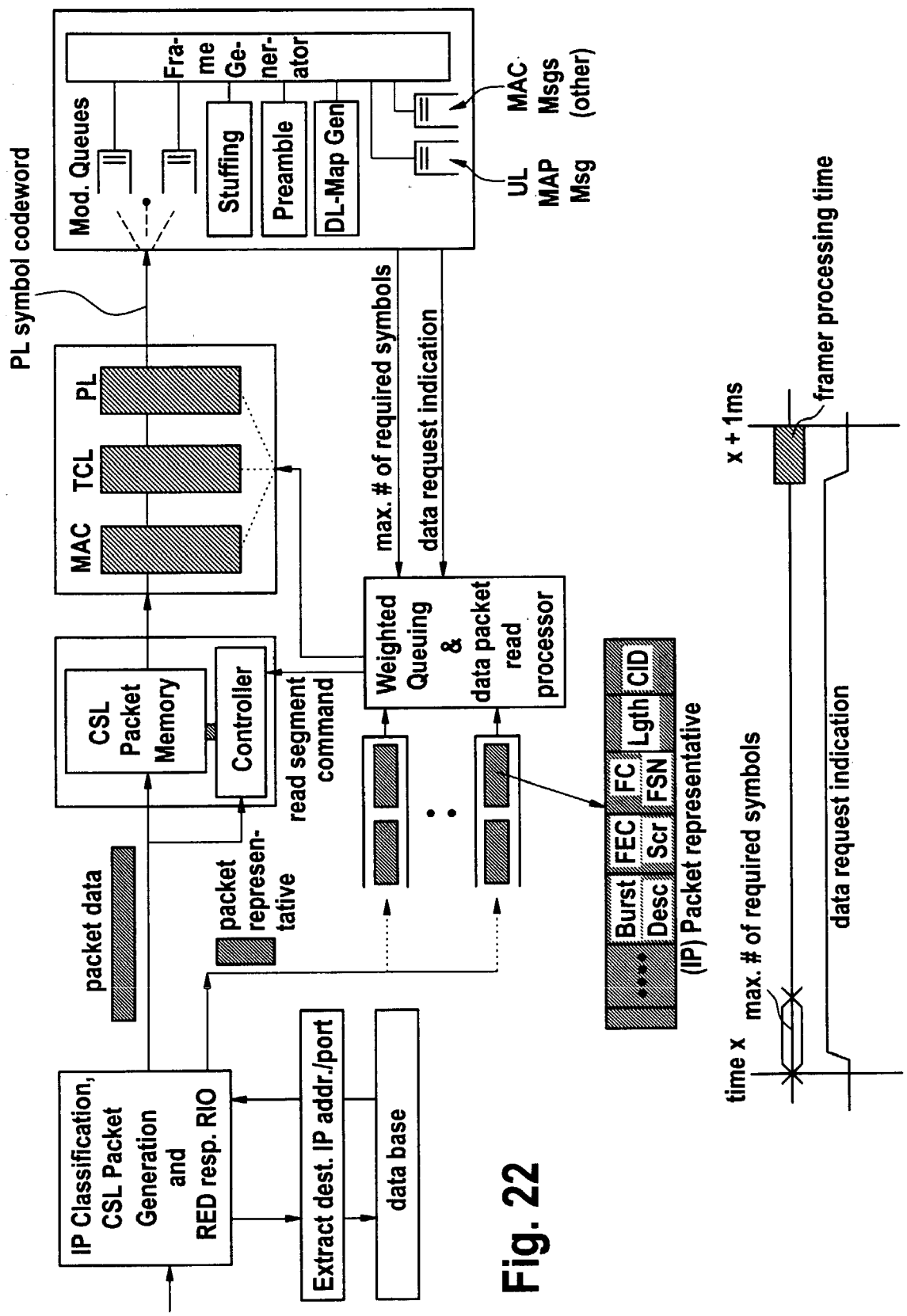
FIG. 22 shows an advantageous functional realization of the invention.

In the following an Efficient Downlink Framer Implementation is described. The consequence of the plenty of flexibility on all layers from PHY to MAC layer for the downlink framing is that the offered traffic load has a direct influence on the actual frame structure and actually carried overhead and herewith on the actual achievable payload bitrate. The framer has to multiplex the MAC and Phy message and the user data into the downlink frame. As the MAC and Phy messages in most cases have priority against the user data, the framer has to calculate individually for each frame the remaining amount of symbols usable for carrying data payload. The framer has no knowledge about the number of data bits to carry with the given amount of symbols. This is due to the fact the data packets waiting in the packet queues are transported with individual modulation types and coding overhead. Therefore, it is foreseen that the framer indicates the amount of symbols and the time window where it accepts data inputs (codewords) towards a queuing module (weighted queuing & data packet read processor) which is aware of the waiting priority of the packets and the burst descriptor (FIG. 22). This module controls the read out of data portions (payload of the TCL packet) out of the CSL packet memory, the processing in the MAC, TCL, PL modules and the forwarding into the appropriate modulation queue located in the framing sub-module.

This concept allows prioritized packet forwarding and requires minimum amount of memory space, because of the application of a shared memory concept.

FIG. 22 shows an advantageous functional realization of the invention.

Description of the Framing Concept:

The (IP) packet classification ascertains with the help of the database all the QoS, MAC and Phy parameters which are required for the framer processing. These values and the storage position of the data packet are inserted into a packet representative and is forwarded into the dedicated logical queue. Simultaneous to this forwarding, the data packet is stored in the central CSL packet memory.

The weighted queuing and data packet read processor module selects a data packet from one of his queues and then starts to provide the framing sub-module with data packet portions which fit exactly into the dedicated TCL packet payload. All the required information for this processing is stated in the packet representative. The data packet read processor controls also the MAC, TCL and PL modules and provides them with the required information. The data read process is started as soon as the framing sub-module sets the data request indication. Parallel to this start signal the data packet read processor gets also the number of remaining payload symbols in the downlink frame. This information allows to further optimise the selection of the data packet portions with the goal to fill the downlink frame with minimum amount of stuffing information. Stuffing information has to be inserted into the downlink frame as soon as the number of PL symbol codewords do not fit into the available payload frame area. The amount of symbols within a PL symbol codeword depends on the burst descriptor. Concurrent multiple burst descriptors for the same downlink are allowed. PL symbol codewords belonging to different burst descriptors have different sizes in number of symbols.

The weighted queuing and data packet read processor has to follow two different optimization strategies. It has to be clearly stated that the major optimization strategy is on the Quality of Service goals. Only for the last or last n PL symbol codewords the minimum stuffing symbol algorithm takes place.

The performance advantage and the design effort for this overhead reduction will be investigated using the simulation model.

The framing sub-module will indicate the stop of delivery to the data packet read processor if sufficient symbols are received or the frame processing has to be started. During the framer processing time the framing sub-module generates the DL-MAP which has to fit exactly to the received data payload and MAC and PHY information and hands over the pointer on the data locations to the downlink framer generator. The downlink framer generator performs on the fly translation from byte processing to symbol format according to the frame structure and DL-MAP information.

Therefore, the downlink framer generator produces first the frame control header producing 4 QAM symbols. This header includes the pre-amble pattern, followed by the MAC messages (DL-MAP, . . . ) which have to be inserted into the PHY control part, and followed by the MAC messages (UL-MAP, . . . ) which have to be inserted into the MAC control part. After delivery of the frame control header symbols to the downlink modulation unit, the framer reads out the PL scrambled packets from the 4 QAM, then 16 QAM and 64 QAM queues and performs an on the fly conversion from byte processing to symbol delivery. If one or several modulation queues do not contain any packets, it will jump towards the next modulation queue. In case that there is not sufficient data to fill the downlink frame stuffing is foreseen.

FIG. 22 shows a base station for a point-to-multipoint radio network, in particular LMDS, including an inter-layer framer, the inter-layer framer including a series connection of a queuing module (weighted queuing & data packet read processor) and a downlink framer (frame generator), the downlink framer having a feedback loop to the queuing module to stepwise transmit the actual number of unused symbols (max. # of required symbols) in the next frame to be transmitted via the downlink and a data request indication, and the queuing module being capable to stepwise decide which information packet to be forwarded to the downlink framer in order to include the information packet into the next frame, the decision being dependent on the actual number of unused symbols received by the downlink framer.

In an advantageous embodiment of the invention the queuing module includes at least two queues to intermediately store different prioritized quality of services parameters, and the queuing module is being capable to decide which information packet to be forwarded to the downlink framer in order to include the information packet into the next frame, the decision being dependent on the actual number of unused symbols received by the downlink framer, the priority of the quality of services parameters, and the length of the corresponding intermediately stored information packets to be forwarded.

Figure 23:
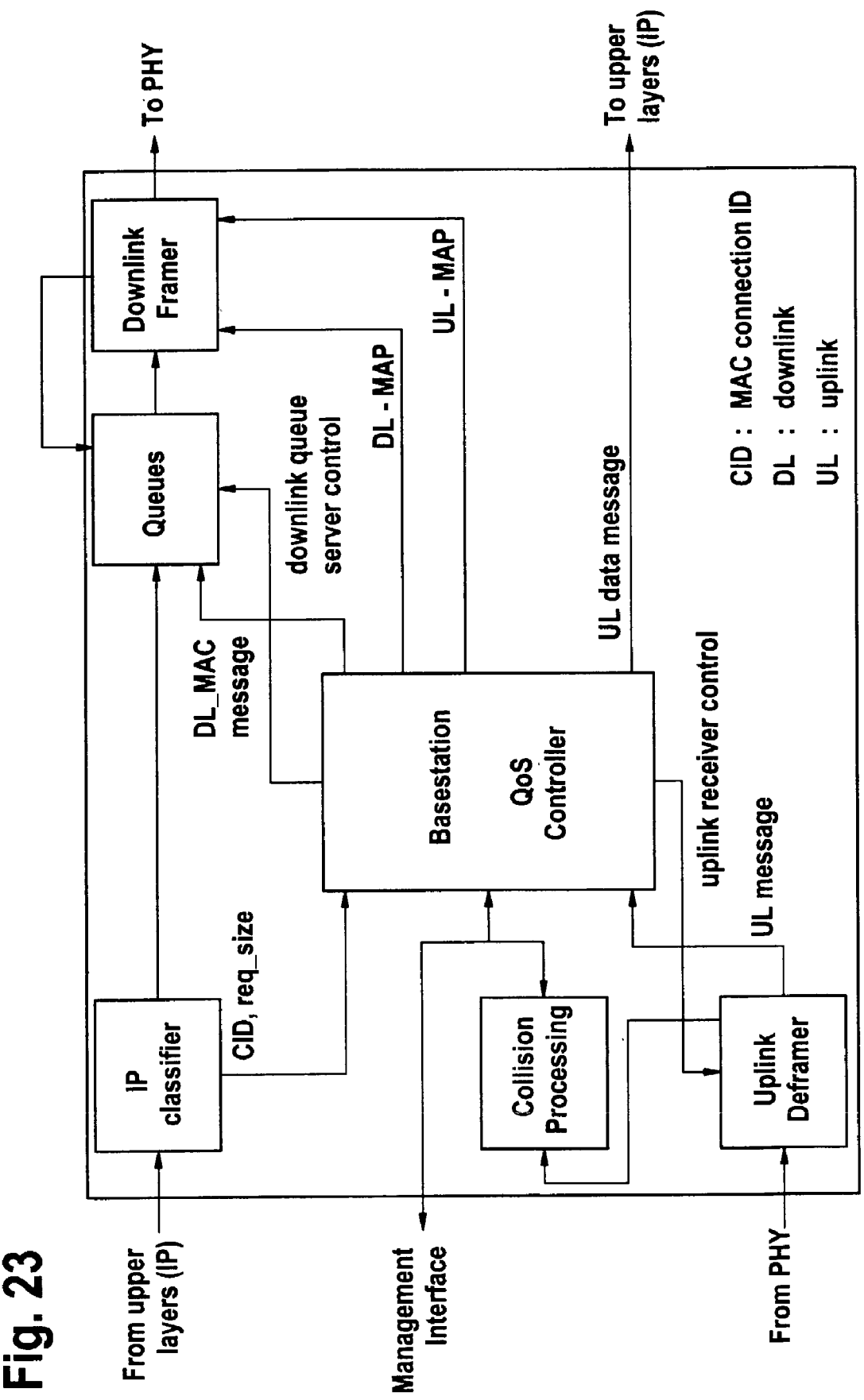
FIG. 23 shows a schematic diagram of an inventive base station.

FIG. 23 shows a schematic diagram of an inventive base station for a point-to-multipoint radio network, in particular LMDS, including an inter-layer framer, the inter-layer framer including a series connection of a queuing module (queues plus at least part of (the functionality) of the QoS controller) and a downlink framer, the downlink framer having a feedback loop to the queuing module to stepwise transmit the actual number of unused symbols in the next frame to be transmitted via the downlink, and the queuing module being capable to stepwise decide which information packet to be forwarded to the downlink framer in order to include the information packet into the next frame, the decision being dependent on the actual number of unused symbols received by the downlink framer.

The base station includes an IP classifier, queues, a downlink framer, a QoS controller, an uplink deframer, and a collision processing. The feedback loop for the actual remaining frame symbols of the next frame to be transmitted could be either fed back from the downlink framer to the queues or from the downlink framer to the QoS controller.

In an advantageous embodiment of the invention the queuing module includes at least two queues to intermediately store different prioritized quality of services parameters, and the queuing module is being capable to decide which information packet to be forwarded to the downlink framer in order to include the information packet into the next frame, the decision being dependent on the actual number of unused symbols received by the downlink framer, the priority of the quality of services parameters, and the length of the corresponding intermediately stored information packets to be forwarded.

| Abbreviations: | |
| --- | --- |
| AAL | ATM Adaptation Layer |
| AF | Assured Forwarding |
| ATM | Asynchronous Transfer Mode |
| BA | Behavior Aggregate |
| BE | Best Effort |
| BS | Base Station |
| BW | Bandwidth |
| CBR | Constant Bit Rate |
| CID | Connection Identifier |
| CSL | Convergence Sub-Layer |
| DiffServ | Differentiated Services |
| DIUC | Downlink Interval Usage Code |
| DL-MAP | Downlink Map |
| DS | Differentiated Services |
| DSCP | Differentiated Services Codepoint |
| FC | Fragmentation Control |
| FDD | Frequency Division Duplex |
| FEC | Forward Error Correction |
| FIFO | First In First Out |
| FSN | Fragment Sequence Number |
| FTP | File Transfer Protocol |
| GPC | Grant per Connection |
| GPT | Grant per Terminal |
| GW | Gateway |
| ID | Identifier |
| IntServ | Integrated Services |
| IP | Internet Protocol |

| -continued | |
| --- | --- |
| Abbreviations: | |
| IPv4 | Internet Protocol Version 4 |
| IPv6 | Internet Protocol Version 6 |
| ISP | Internet Service Provider |
| LAN | Local Area Network |
| LMDS | Local Mulitpoint Distributed Services |
| MAC | Medium Access Control |
| MPEG | Motion Picture Expert Group |
| MSDU | MAC Service Data Unit |
| NAP | Network Access Point |
| nrtPS | non Real Time Polling Service |
| PDU | Protocol Data Unit |
| PHB | Per Hob Behavior |
| PHY | Physical Layer |
| PL | Physical Layer |
| PM | Poll Me |
| QAM | Quadrate Amplitude Modulation |
| QoS | Quality of Service |
| RED | Random Early Detection |
| RIO | RED with IN and OUT |
| rtPS | Real-Time Polling Service |
| SFID | Service Flow Identification |
| SI | Slip Indication |
| SLA | Service Layer Agreement |
| SS | Subscriber Station |
| TCL | Transmission Control Layer |
| TCP | Transmission Control Protocol |
| TDM | Time Division Duplex |
| UDP | User Data Protocol |
| UGS | Unsolicited Grant Service |
| UGS-AD | UGS with Activity Detection |
| UIUC | Uplink Interval Usage Code |
| UL | Uplink |
| VoIP | Voice over IP |
| VPN | Virtual Private Network |

The invention claimed is:

1. Base station for a point-to-multipoint radio network, in particular LMDS, including an inter-layer framer, the inter-layer framer including a series connection of a queuing module and a downlink framer, the downlink framer having a feedback loop to the queuing module to stepwise transmit the actual number of unused symbols in the next frame to be transmitted via the downlink, and the queuing module being capable to stepwise decide which information packet to be forwarded to the downlink framer in order to include the information packet into the next frame, the decision being dependent on the actual number of unused symbols received by the downlink framer.

2. Base station according to claim 1, wherein the queuing module includes at least two queues to intermediately store different prioritized quality of services parameters, and the queuing module being capable to decide which information packet to be forwarded to the downlink framer in order to include the information packet into the next frame, the decision being dependent on the actual number of unused symbols received by the downlink framer, the priority of the quality of services parameters, and the length of the corresponding intermediately stored information packets to be forwarded.

3. Base station according to claim 1, wherein the queuing module includes a processor and at least two queues to intermediately store different quality of services parameters.

4. Base station according to claim 1, wherein the information packets are QPSK and/or QAM modulated data packets and/or QPSK and/or QAM modulated IP packets.

* * * * *